(12) United States Patent
Ngai et al.

(10) Patent No.: US 12,267,827 B2
(45) Date of Patent: Apr. 1, 2025

(54) ADAPTIVE RADIO FREQUENCY COEXISTENCE MITIGATION

(71) Applicant: QUALCOMM Incorporated, San Diego, CA (US)

(72) Inventors: Francis Ming-Meng Ngai, Louisville, CO (US); Eric Tsou, Palo Alto, CA (US); Michael Kohlmann, San Francisco, CA (US); Olaf Josef Hirsch, Sunnyvale, CA (US); Shriram Gurumoorthy, Denver, CO (US); Steve Andre Beaudin, Fremont, CA (US); Vikram Phogat, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 17/729,204

(22) Filed: Apr. 26, 2022

(65) Prior Publication Data
US 2023/0345452 A1 Oct. 26, 2023

(51) Int. Cl.
*H04B 1/525* (2015.01)
*H04W 72/12* (2023.01)

(52) U.S. Cl.
CPC .............................. *H04W 72/1215* (2013.01)

(58) Field of Classification Search
CPC ........................... H04W 72/1215; H04B 1/525
See application file for complete search history.

(56) References Cited

U.S. PATENT DOCUMENTS

| 11,522,290 B1* | 12/2022 | Ma | H01Q 1/2283 |
| 2007/0225033 A1* | 9/2007 | Yoon | H01Q 1/2216 455/132 |
| 2017/0125920 A1* | 5/2017 | Spiel | H01Q 19/10 |

(Continued)

FOREIGN PATENT DOCUMENTS

CN 109216865 B 3/2021

OTHER PUBLICATIONS

International Search Report and Written Opinion—PCT/US2023/019771—ISA/EPO—Aug. 3, 2023.

*Primary Examiner* — Yemane Mesfin
*Assistant Examiner* — Jia Hao Deng
(74) *Attorney, Agent, or Firm* — Paul M. McAdams; Loza & Loza LLP

(57) ABSTRACT

Aspects relate to wireless communication at a wireless communication device. The wireless communication device may include a transmitter configured to communicate using a first communication protocol, a receiver configured to communicate using a second communication protocol, different from the first communication protocol, a first antenna coupled to the transmitter, a second antenna coupled to the receiver and physically separated from the first antenna by a variable distance. The wireless communication device transmits, via the first antenna, a first transmission within a first frequency range, and receives via the second antenna, a second transmission within a second frequency range that overlaps the first frequency range. To receive the second transmission, the device may perform a radio frequency coexistence mitigation procedure based on the variable (Continued)

distance between the first antenna and the second antenna in response to detection of a concurrency in time between the first transmission and the second transmission.

24 Claims, 16 Drawing Sheets

(56) References Cited

U.S. PATENT DOCUMENTS

2019/0103656 A1\* 4/2019 Shi .......................... H01Q 1/521
2021/0250775 A1    8/2021 Hardin et al.
2022/0361202 A1\* 11/2022 Yi .......................... H04W 24/10

\* cited by examiner

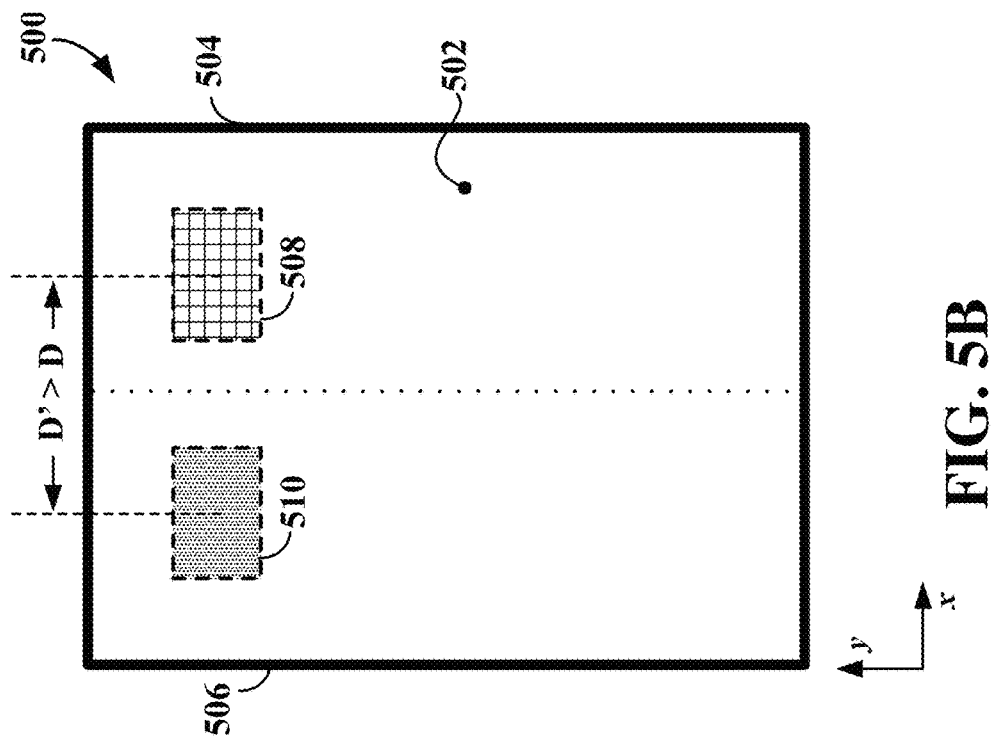
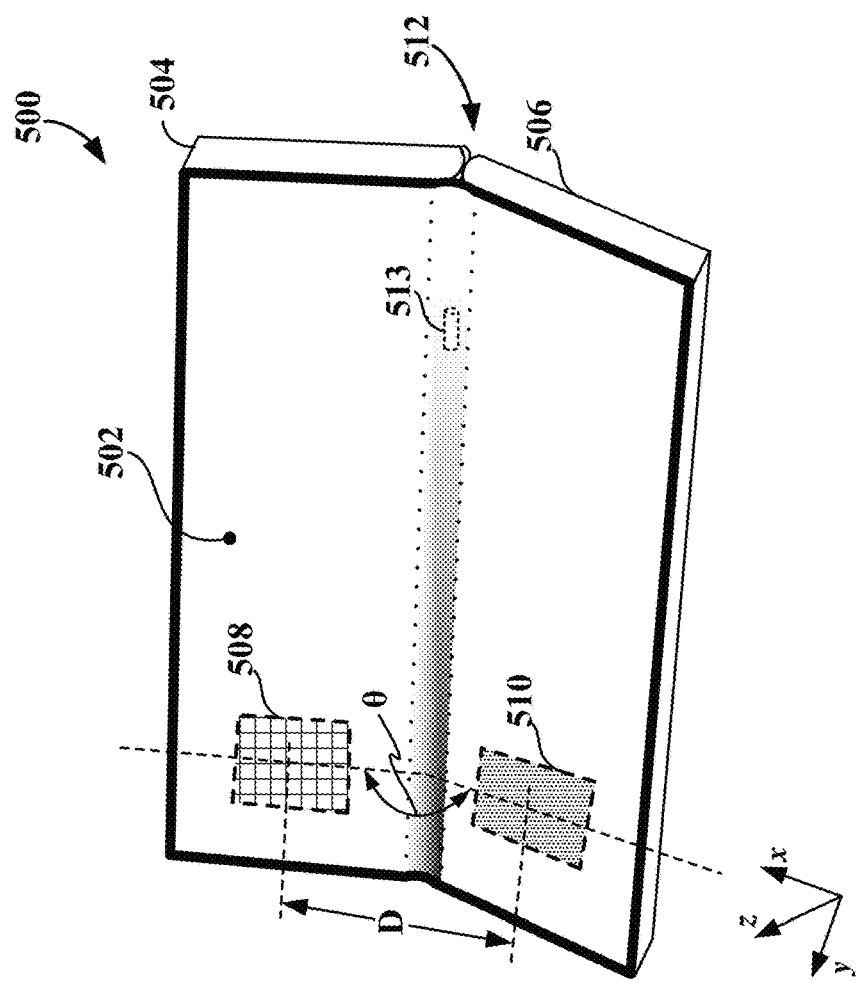
FIG. 5B
FIG. 5A

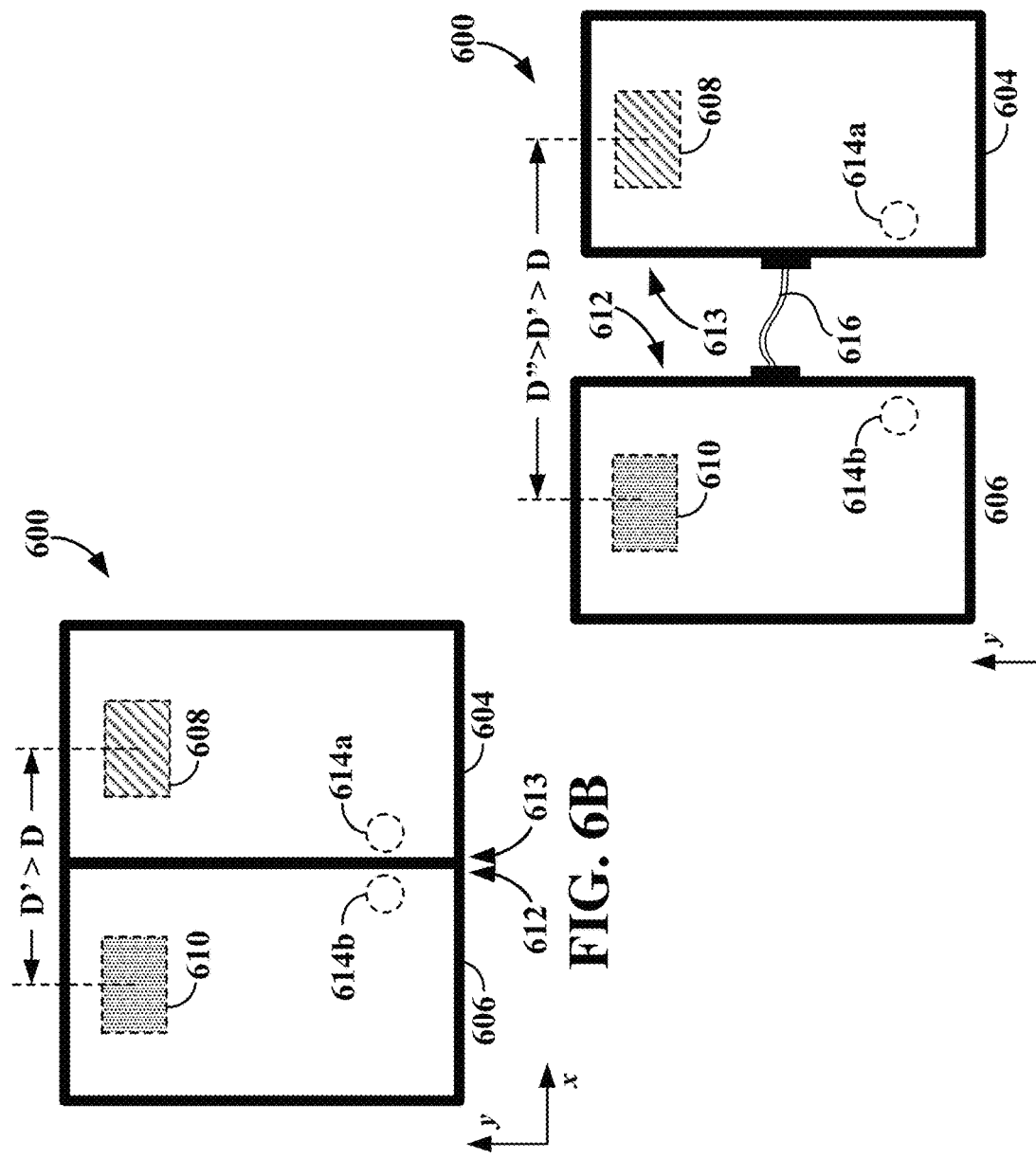
FIG. 6C
FIG. 6B
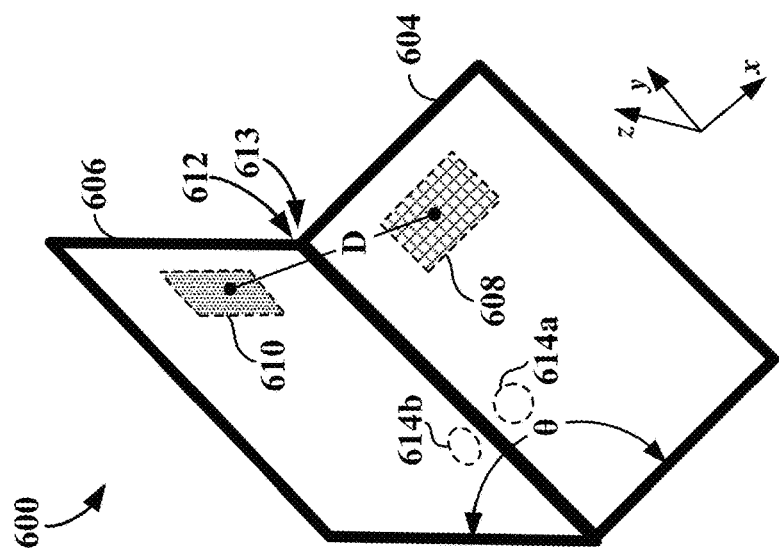
FIG. 6A

ADAPTIVE RADIO FREQUENCY COEXISTENCE MITIGATION

INTRODUCTION

The technology discussed below relates generally to wireless communication networks, and more particularly, to procedures for adaptive radio frequency (RF) coexistence mitigations based on the physical distance between antennas of an aggressor and a victim.

Wireless communication between devices, between a device and a base station (e.g., eNB, gNB), between a device and a network access point (e.g., a WiFi router), between a device and machines (e.g., machine to machine communication), between a device and a vehicle and/or infrastructure (e.g., vehicle to everything communication), to a device from a satellite (e.g., global navigation satellite system), as well as a many other communication links, are made wirelessly by the use of a myriad of communication protocols. For versatility and useability, a given wireless communication device (e.g., a user equipment (UE)) may have two or more radios and antennas tuned to licensed and unlicensed radio channels (within frequency bands across the spectrum). The radio channels of different communication protocols are generally spaced far enough apart so that, for a given device, communications in a first channel using a first communication protocol do not interfere with concurrent communications in a second channel using a second communication protocol. Still, a transmitter coupled to a first antenna in a given wireless communication device, which is transmitting on a first channel, may produce spurious outputs that fall in or near a second channel and may additionally or alternatively transmit energy in or near the second channel that can interfere with reception of messages on the second channel by a receiver coupled to a second antenna on the given wireless communication device.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is disclosed. The wireless communication device includes a transmitter configured to communicate using a first communication protocol, a receiver configured to communicate using a second communication protocol, different from the first communication protocol, a first antenna coupled to the transmitter, a second antenna coupled to the receiver and physically separated from the first antenna by a variable distance, a memory, and a processor communicatively coupled to the memory, the transmitter, the receiver, the first antenna, and the second antenna. In the example, the processor is configured to: transmit, via the first antenna, a first transmission within a first frequency range; and receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission.

In another example, a method of wireless communication at a wireless communication device is disclosed. The method includes transmitting, via a first antenna, a first transmission within a first frequency range, and receiving, via a second antenna, a second transmission within a second frequency range that overlaps the first frequency range. To receive the second transmission, the method also includes: performing a radio frequency coexistence mitigation procedure based on a variable distance between the first antenna and the second antenna in response to detection of a concurrency in time between the first transmission and the second transmission.

In another example, a wireless communication device is disclosed. The wireless communication device includes means for transmitting, via a first antenna, a first transmission within a first frequency range, and means for receiving, via a second antenna, a second transmission within a second frequency range that overlaps the first frequency range. To receive the second transmission, the wireless communication device further includes means for performing a radio frequency coexistence mitigation procedure based on a variable distance between the first antenna and the second antenna in response to detection of a concurrency in time between the first transmission and the second transmission.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 5A and 5B are schematic drawings depicting two respective possible shapes of a wireless communication device according to some aspects.

FIGS. 6A, 6B, and 6C are schematic drawings depicting three respective possible shapes of a wireless communication device according to some aspects.

DETAILED DESCRIPTION

Figure 1:
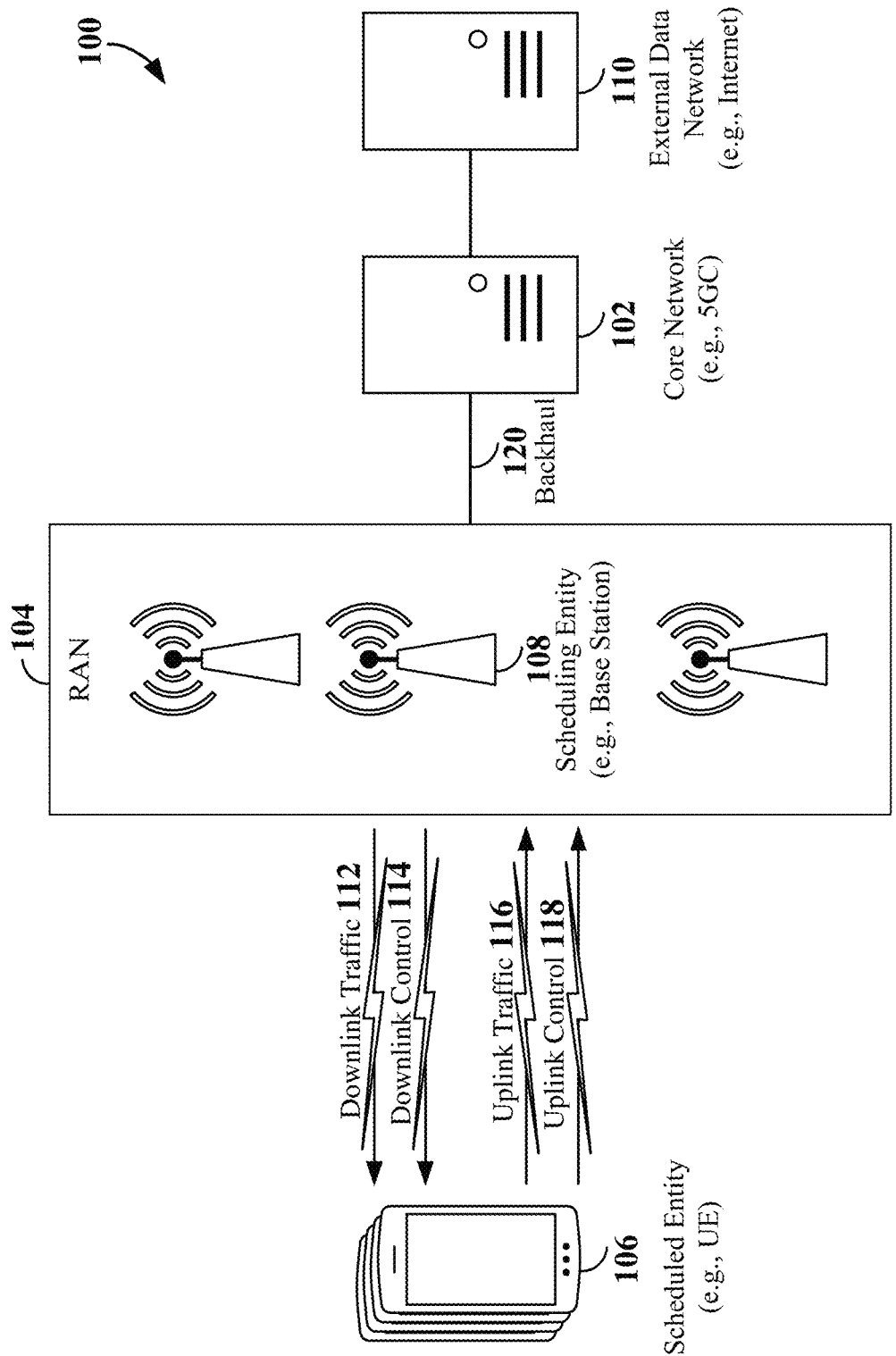
FIG. 1 is a schematic illustration of a wireless communication system that includes three interacting domains: a core network, a radio access network (RAN), and a user equipment (UE), according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to radio frequency coexistence procedures between antennas of a given wireless communication device. Different mitigation procedures may include, but are not limited to, channel avoidance, transmitter power reduction, transmitter blanking, receiver blanking, time division multiplexing between periods of transmission and reception, and/or the prevention of concurrent transmitter and receiver operations. In some examples of wireless communication devices (e.g., foldable devices, tiled devices, etc.), the shape of the wireless communication device may be varied. Radio frequency coexistence procedures may be applied to these examples of wireless communication devices to facilitate concurrent or pseudo-concurrent use of the same or adjacent spectrum by an aggressor transmitter/antenna and a victim receiver/antenna of the wireless communication device. However, radio frequency coexistence procedures may be challenging to apply given the ability to change the shape of the wireless communication device and the attendant variability of the distance between the aggressor transmitter/antenna and the victim receiver/antenna as the shape of the wireless communication device changes.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station or UE), end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
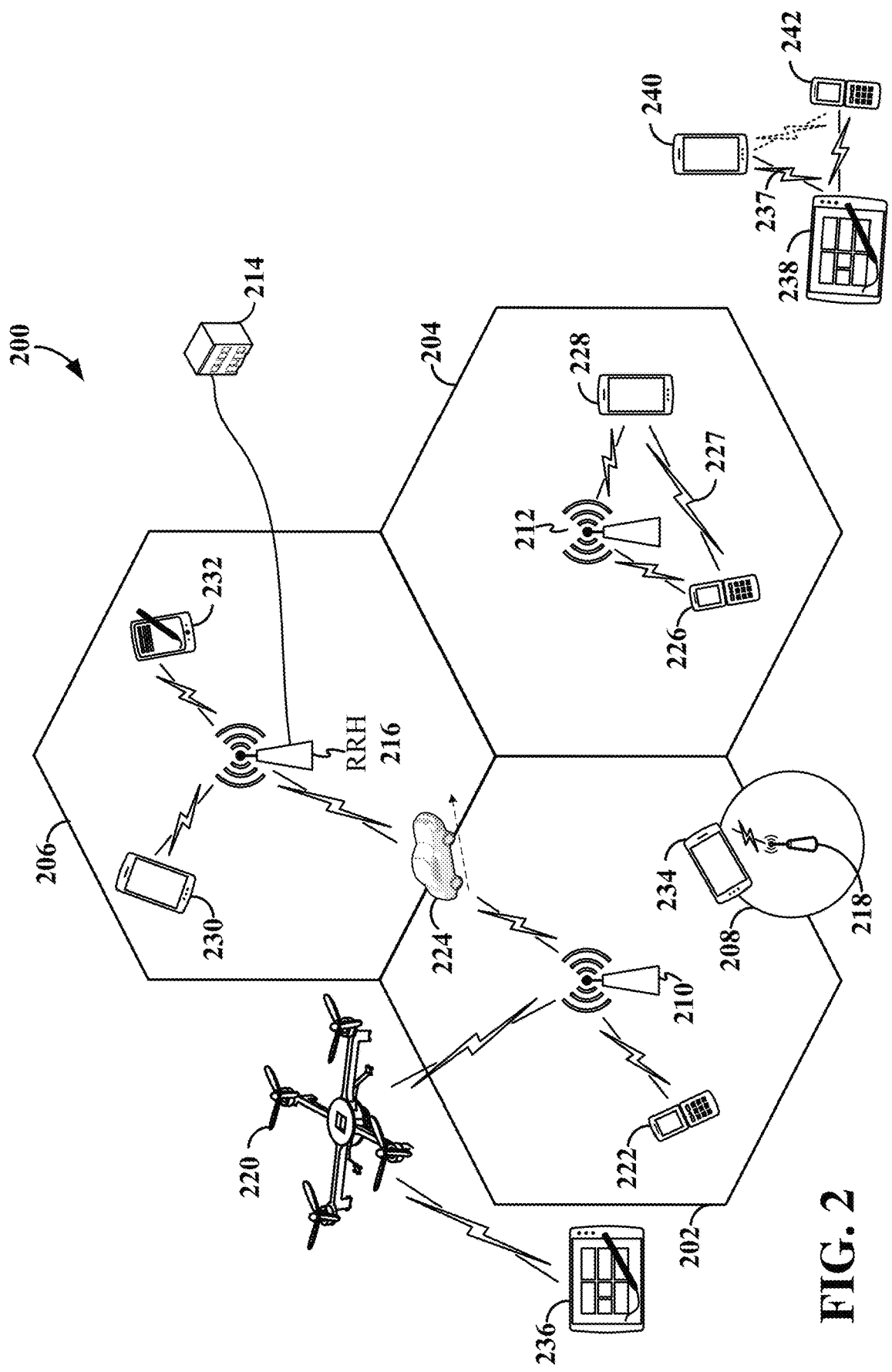
FIG. 2 is a diagram illustration of a wireless radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies.

Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
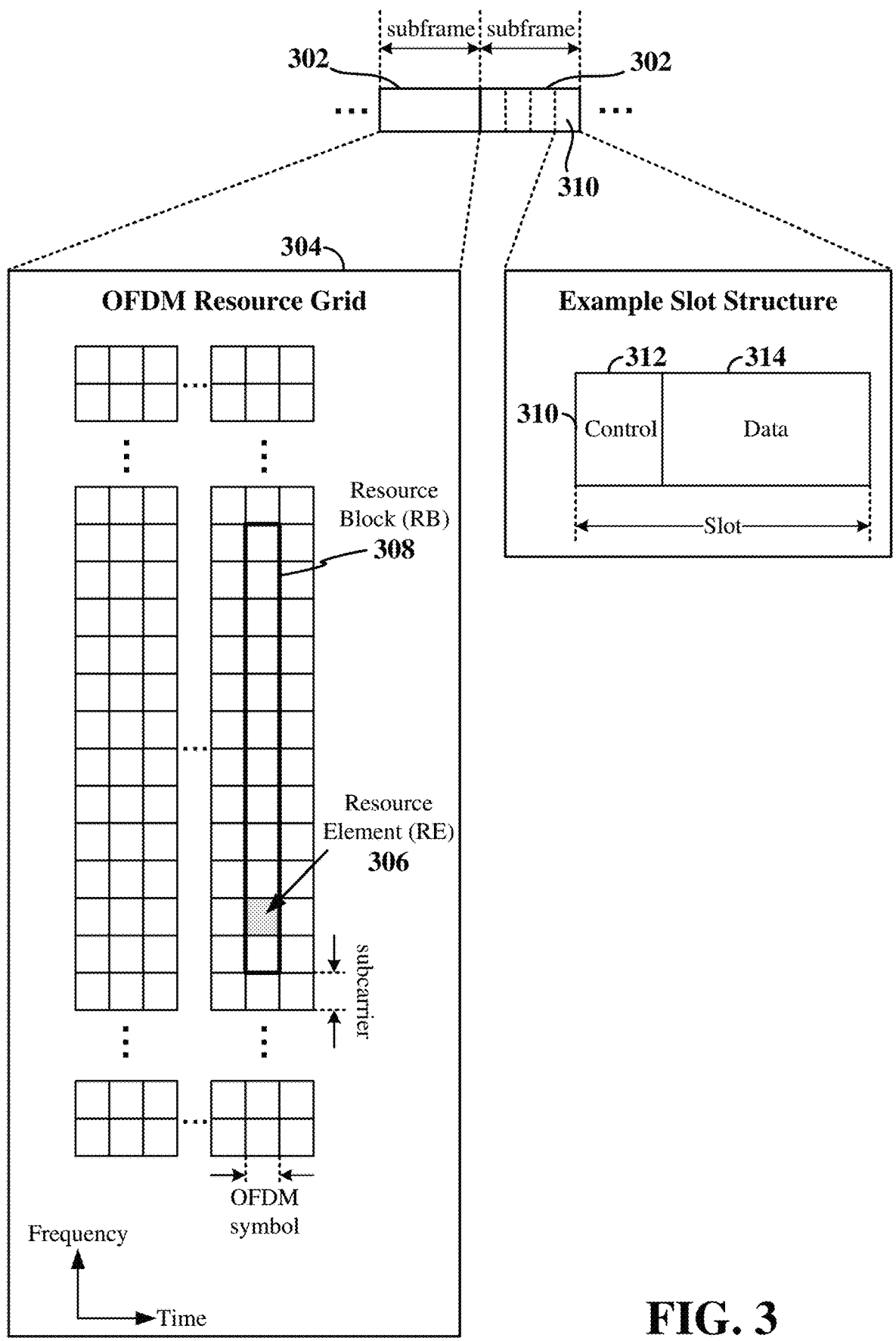
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
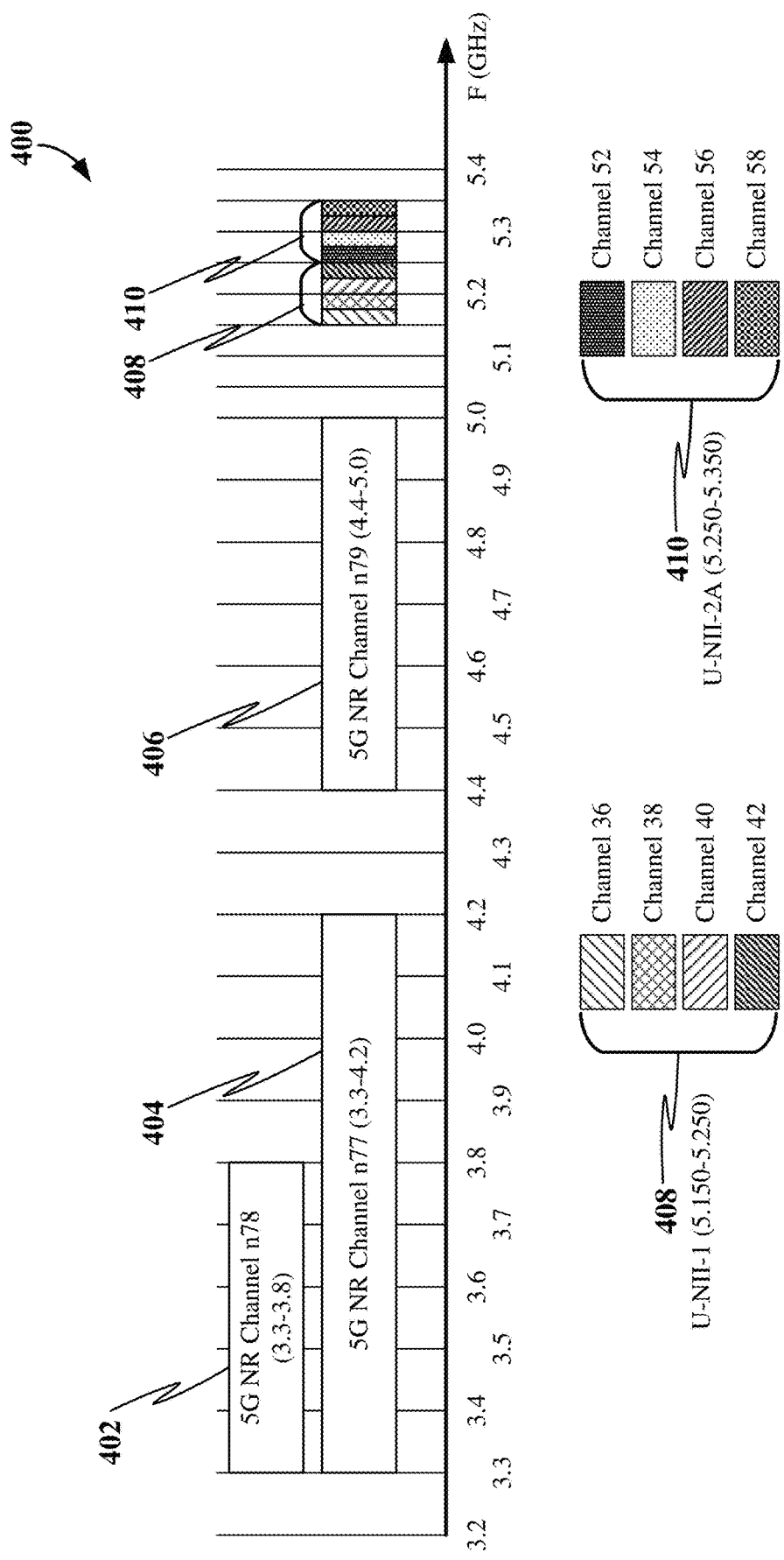
FIG. 4 is a frequency spectrum allocation chart.

FIG. 4 is a frequency spectrum allocation chart 400. The chart is abridged. As known to those of skill in the art, the frequency spectrum is occupied by hundreds of channels throughout large swaths of the spectrum. FIG. 4 depicts a handful of channels allocated to 5G NR and Unlicensed National Information Infrastructure (U-NII) communications. The channels depicted in FIG. 4 are provided for illustration and discussion and not limitation.

Wireless communication between devices in radio channels allocated for use in an area utilize various communication protocols. Generally, the communication protocols are standardized, but standardization is not a requirement. One example of a standardized communication protocol is 5G (as well as 4G, LTE, and their predecessors), whose standard-setting body is the Third Generation Partnership Project (3GPP). The radio access technology developed by 3GPP for the 5G network is known as the 5G New Radio (NR) access technology. Another standardized communication protocol is WiFi (also known as the Institute of Electrical and Electronics Engineers (IEEE) 802.11), whose standard-setting body is the WiFi Alliance. Another example of a standardized communication protocol is Bluetooth, whose standard-setting body is the Bluetooth Special Interest Group. Another example of a standardized communication protocol is WiMAX (also known as IEEE 802.16), whose standard-setting body is the WiMAX Forum. Other communication protocols, whether standardized or not standardized, may be utilized by the radio(s) of a wireless communication device.

The size and shape of antennas used by wireless communication devices for transmission and reception of messages (e.g., user traffic and control signals) largely depend on frequency. Because the various communication protocols operate in different frequency bands, wireless communication devices often include two or more antennas. For example, one antenna may be used for 5G NR in 5G NR frequency bands, while another antenna may be used for WiFi in WiFi frequency bands. The frequency bands utilized for the two techniques may be adjacent to one another.

For example, a first 5G NR channel 402 (channel n77) spans a predefined bandwidth of 3.300 to 4.200 GHz. A second 5G NR channel 404 (channel n78) spans a predefined bandwidth of 3.300-3.800 GHz. A third 5G NR channel 406 (channel n79) spans a predefined bandwidth of 4.400-5.000 GHz. A first plurality of U-NII channels 408 (channels 36, 40, 44, and 48) span a predefined bandwidth of 5.150-5.250 GHz (where a predefined bandwidth of each of channels 36, 40, 44, and 48 is 20 MHz). The channels of the first plurality of U-NII channels 408 may be known as U-NII-1, U-NII Low, or U-NII Indoor channels. A second plurality of U-NII channels 410 (channels 52, 56, 60, and 64) spans a predefined bandwidth of 5.250-5.350 GHz (where a predefined bandwidth of each of channels 52, 56, 60, and 64 is 20 MHZ). The channels of the second plurality of U-NII channels 410 may be known as U-NII-2A or U-NII Mid channels. The recited channels are recited for purposes of discussion and not limitation.

Although there is a separation between the upper end of 5G NR channel n79 and the lower end of U-NII-1 channel 36, the transmitters tuned to these channels may emit spurious signals, intermodulation products, and other unwanted energy at frequencies corresponding to an adjacent channel (e.g., channels n79 is a neighbor to channel 36) and/or corresponding to frequencies within the inter-channel space separating neighboring channels. The stop bands of transmitter and receiver filters used in wireless communication devices (such as mobile phones, UEs) may not provide an amount of attenuation that would render the spurious signals, intermodulation products, and other unwanted energy (either in-channel or at the channel edges) inconsequential to a receiver of the adjacent channel. Therefore, radio frequency (RF) coexistence issues may arise in any given wireless communication device between the device's transmitter transmitting using a first antenna (where the transmitter/first antenna may be referred to as an "aggressor") and the device's receiver receiving using a second antenna (where the receiver/second antenna may be referred to as a "victim").

FIGS. 5A and 5B are schematic drawings depicting two possible shapes (e.g., mechanical configurations) of a wireless communication device 500 (e.g., a UE) according to some aspects. The wireless communication device 500 may be a foldable type of wireless communication device having a flexible display screen 502 that covers a first segment 504 (e.g., a first half, a right half) and a second segment 506 (e.g., a second half, a left half) of the wireless communication device 500. The flexible display screen 502 may form a continuous surface coupled electrically and mechanically to the first segment 504 and the second segment 506 and bridge therebetween. Also depicted in the wireless communication device 500 are a first antenna 508 and a second antenna 510. The first antenna 508 and the second antenna 510 are distinct antennas. The first antenna 508 and the second antenna 510 are exemplary and non-limiting. They are represented as patches for the convenience of illustration and not limitation. They are depicted in phantom view as antennas, in general, may be coupled to the interior surfaces and/or edges of the housings of the first segment 504 and the second segment 506. All shapes, form factors, types (e.g., patch antenna, microstrip antenna, planar inverted-F antenna (PIFA), printed antenna, planar meander line, folded loop, modified dipole, etc.), quantity (e.g., singular antenna or antenna array, or any combination thereof), and locations (e.g., centrally located, located adjacent to edges of the housings or any combination thereof) of antennas as known to those of skill in the art are within the scope of the disclosure.

In the example of FIG. 5A, the wireless communication device 500 is in a partially opened state. The first segment 504 and the second segment 506 may be rotatably coupled by a hinge 512 (substantially obscured from view). The first segment 504 and the second segment 506 may form a vertex at the hinge 512. An angle, θ, may be measured between the first segment 504 and the second segment 506, measured about the hinge 512 (i.e., the vertex). The hinge 512 may allow the angle, θ, to be varied continuously from a closed position (e.g., 0~0 degrees) to a flat open (or substantially flat open) position (e.g., 0~180 degrees as shown in FIG. 5B). The hinge 512 may be formed to provide resistance to oppose rotationally opening and closing forces exerted on the first segment 504 and the second segment 506. In some examples, the angle, θ, between the first segment 504 and second segment 506 may be maintained (e.g., by friction) once application of rotationally opening or closing forces exerted on the first segment 504 and/or the second segment 506 are stopped. In some examples, a detent feature (not shown) (e.g., a predetermined detent feature) may be implemented in connection with the hinge 512. The detent feature may serve to identify discrete angular values of 0 (e.g., 0, 90, 135, 180 degrees) to allow a user to conveniently stop at one of the discrete angular values when opening (or closing) the wireless communication device 500. A sensor 513, represented in phantom view in FIG. 5A, may obtain a measure of the angle θ. The measure of the angle θ may be provided by the sensor 513 to a processor (not shown) of the wireless communication device 500. Although the sensor 513 is represented as being cylindrical and coaxial with the hinge 512, any shape of sensor positioned along or adjacent to the hinge 512, the first segment 504, and/or the second segment 506 are within the scope of the disclosure. The sensor 513 may be formed, for example, as a Hall effect sensor, a potentiometer, a varactor, a gyroscope, one or more accelerometers, or any device that may measure the angle θ and, either on its own or via an intermediate circuit, provide the measure of the angle θ to the processor (not shown) of the wireless communication device.

Although there is one flexible display screen 502, the image display area of the one flexible display screen 502 may be subdivided into two or more sub-areas. There is no limit on the number of sub-areas. In one example, in the partially opened state of FIG. 5A, a user may invoke a touchscreen-type keyboard in the sub-area of the flexible display screen 502 corresponding to the second segment

506. The user may invoke a video display screen in the sub-area of the flexible display screen 502 corresponding to the first segment 504. The user might place the second segment 506 flat on a table or other surface, use the touchscreen type keyboard corresponding to the second segment 506, and view the video display screen corresponding to the first segment 504 in the partially opened state depicted in FIG. 5A. In another example, a camera lens (not shown) in a plane parallel to a surface of the first segment 504 (e.g., capturing a viewable image perpendicular to the plane) may be pointed upward or downward relative to a plane parallel to the second segment 506. In the second example, there may be no reason to invoke a touchscreen-type keyboard on any area of the flexible display screen 502. The flexible display screen 502 could be turned off, show an image as seen by the camera lens, be caused to illuminate the image's subject (e.g., with a flat white or colored light emitted from the flexible display screen 502), or serve some other purpose. The preceding examples are exemplary and non-limiting.

In the example of FIG. 5A, the first segment 504 and second segment 506 form an approximately 135 degree angle (e.g., θ≈135 degrees). However, the illustrated angle is merely representative of one of many angular positions that the first segment 504 and second segment 506 may form. In FIG. 5B, for example, the wireless communication device 500 is depicted in a flat open configuration (e.g., θ=180 degrees or substantially 180 degrees).

The exemplary wireless communication device 500 of FIGS. 5A and 5B may concurrently transmit/receive using two or more wireless communication technologies. For example, an outgoing transmission on 5G NR channel n79 from a transmitter coupled to a first antenna 508 may be ongoing when an incoming message from a WiFi router on U-NII-1 channel 36 is received at a receiver coupled to a second antenna 510. The communications coexist and, due to the proximity of their center frequencies (and proximity of their band edges), the out of band emissions transmitted by the transmitter coupled to the first antenna 508 (the "aggressor") may interfere with the reception of the receiver coupled to the second antenna 510 (the "victim"). Accordingly, in the example, same-device (in-device) RF coexistence mitigation procedures may be applied to reduce the adverse effects of concurrent transmission and reception operations of possibly interfering channels.

Wireless communication devices are produced in many shapes. Some wireless communication devices may have two parts and a flexible display screen that folds open and closes about a hinge between the two parts. Other wireless communication devices may be separated into tiles (e.g., a first tile with a display screen and a second tile with a keyboard). The tiles may be adjacent to one another or spaced apart from one another and may also be angularly varied relative to each other, even in the absence of a hinge (such as the hinge of the foldable device that facilitates the opening and closing of the two parts of the foldable device).

In these examples, a first part or first tile may include a first antenna, and a second part or second tile may include a second antenna. Accordingly, the distance between the first and second antennas of a foldable device varies based on the angle formed between the first and second parts relative to the hinge. An additional distance component may be added in connection with a tiled device because the tiles of the tiled device are not mechanically coupled with a hinge, as are the two parts of a foldable device. Therefore, the distance between the first antenna of a first tile and the second antenna of a second tile may vary based on the angular orientation of the first tile relative to the second tile and the distance of separation between the first and second tiles.

FIGS. 6A, 6B, and 6C are schematic drawings depicting three possible shapes of a wireless communication device 600 (e.g., a UE) according to some aspects. The wireless communication device 600 may be separable into "tiles" and may be referred to herein as a tiled wireless communication device. As used herein, the term "tile" refers to a respective first segment or second segment. Examples of devices that may be separated into tiles include tablets having a display tile and a separable keyboard tile. In some examples, the separable keyboard tile may be releasably coupled with magnetic coupling to the display tile. For example, a first magnet 612 may be coupled to the first tile 604 so that a North pole of the first magnet 612 faces an outer edge. A second magnet 613 may be coupled to the second tile 606 so that a South pole of the second magnet 613 faces an outer edge. The outer edges of the first tile 604 and the second tile 606 may face each other. When the first magnet 612 and the second magnet 613 are brought into proximity, the magnetic attraction between their respective North and South poles may cause the first tile 604 to contact the second tile 606 along the length of the opposing polarity magnets. This configuration is exemplary and non-limiting. Other ways to couple the first tile 604 and the second tile 606 (for example, by use of male and female mechanical coupling features) are within the scope of the disclosure.

In the example of FIG. 6A, the first tile 604 and the second tile 606 of the wireless communication device 600 are coupled and partially opened. The first tile 604 and the second tile 606 may be rotatably coupled along adjacent surfaces of the first magnet 612 and the second magnet 613. An "effective line" (not shown) of contacted surfaces may be formed along the adjacent surfaces. The first tile 604 and the second tile 606 may form a vertex at the effective line. An angle, θ, may be measured between the first tile 604 and the second tile 606, measured about the effective line (i.e., the vertex). The adjacent magnetic surfaces may roll or slide against one another and thereby allow the angle, θ, to be varied continuously from a closed position (e.g., 0~0 degrees) to a flat open (or substantially flat open) position (e.g., 0~180 degrees as shown in FIGS. 6B and 6C). A stand or other support structure/member (not shown) may support, for example, the second tile 606 in a partially upright position (as shown in FIG. 6A), at an angle (e.g., a predetermined angle), θ, between the first tile 604 and second tile 606. The angle may be based, for example, on the geometry of the stand (not shown).

A sensor, illustrated in phantom view for discussion purposes as a sensor first half 614a and a sensor second half 614b, may be coupled to the first tile 604 and the second tile 606. The sensor first half 614a and sensor second half 614b may work together to measure the angle θ. The measure of the angle θ may be provided by the sensor first half 614a or the sensor second half 614b to a processor (not shown) of the wireless communication device 600. The sensor, including the sensor first half 614a and the sensor second half 614b, are represented as being cylindrical; however, any sensor of any form, including one sensor on either the first tile 604 or the second tile 606, or both is within the scope of the disclosure. The sensor first half 614a and/or sensor second half 614b may be formed, for example, as a Hall effect sensor, a potentiometer, a varactor, a gyroscope, one or more accelerometers, or any device that may measure the angle θ and, either on its own or via an intermediate circuit, provide the measure of the angle, θ.

In the example of FIG. 6A, the first tile 604 and second tile 606 form about a 100 degree angle (e.g., 0~100 degrees). However, the illustrated angle is merely representative of one of many angular positions that the first tile 604 and second tile 606 may form. In FIG. 6B, for example, the wireless communication device 600 is depicted in a flat open configuration (e.g., θ=180 degrees or substantially 180 degrees). In FIG. 6B, the first antenna 608 and the second antenna 610 are a fixed distance, D' from each other. In FIG. 6C, for example, the wireless communication device 600 is also depicted in a flat open configuration (e.g., θ=180 degrees or substantially 180 degrees). However, in FIG. 6C the first tile 604 and the second tile 606 are further separated by a distance, D" (where D">D'>D). The first tile 604 and the second tile 606 are communicatively coupled via a cable 616. Alternative ways to communicatively couple the first tile 604 with the second tile 606 (such as with infrared, fiberoptic, Bluetooth, WiMAX, etc.) are within the scope of the disclosure.

The exemplary wireless communication device 600 of FIGS. 6A, 6B, and 6C (like the wireless communication device 500 of FIGS. 5A and 5B) may concurrently transmit/receive using two or more wireless communication technologies in the same scenario as described in connection with FIGS. 5A and 5B. Accordingly, the description of the scenario is not repeated to avoid duplication. As with the example of FIGS. 5A and 5B, spurious and/or out of band emissions transmitted by the transmitter coupled to the first antenna 608 (the "aggressor") may interfere with the reception of the receiver coupled to the second antenna 610 (the "victim"). Accordingly, in the example of FIGS. 6A, 6B, and 6C, same-device (in-device) RF coexistence mitigation procedures may be applied to reduce the adverse effects of concurrent transmission and reception operations of possibly interfering channels.

In the examples of FIGS. 5A, 5B, 6A, 6B, and 6C, the degree and type of mitigation applied may be based on an expected amount of antenna-to-antenna isolation (e.g., first antenna 508 to second antenna 510 isolation, and first antenna 608 to second antenna 610 isolation). The physical distance (e.g., D, D', D") between the antennas involved partially influences antenna-to-antenna isolation. Described herein are RF coexistence mitigation procedures that can be adapted based on the physical distance between a set of antennas used by the wireless communication device 500, 600 in an aggressor and victim situation. The procedures may be based on the choice of antennas used during the coexistence event and on the physical distance between the antennas in the chosen set of antennas.

Concerning the physical distance between the antennas on the wireless communication device 500, 600, that physical distance may be influenced by the "shape" of the device (e.g., the degree to which the user has opened (or not opened) the first segment 504 and second segment 506 of FIG. 5, or opened, not opened, and/or spaced apart the first tile 604 and second tile 606 of FIG. 6) during the coexistence event.

As illustrated in FIG. 5A, the distance, D, between the first antenna 508 and the second antenna 510 changes based on the angle, θ. For example, in FIG. 5A, the angle, θ, is about 135 degrees, and the distance between the first antenna 508 and the second antenna 510 is given as D. In FIG. 5B, the angle, θ, is about 180 degrees and the distance between the first antenna 508 and the second antenna 510 is given as D', where D'>D.

Similarly, and as illustrated in FIG. 6A, the distance, D, between the first antenna 608 and the second antenna 610 changes based on the angle, θ. For example, in FIG. 6A, the angle, θ, is about 100 degrees and the distance between the first antenna 608 and the second antenna 610 is given as D. In FIG. 6B, the angle, θ, is about 180 degrees, and the distance between the first antenna 608 and the second antenna 610 is given as D', where D'>D. In FIG. 6C, the angle, θ, is maintained at about 180 degrees, but the distance between the first antenna 608 and the second antenna 610 is increased and given as D", where D">D'>D.

Generally, the antenna-to-antenna isolation may increase as the distance, D, increases. It follows that that generally, the antenna-to-antenna isolation may increase as the angle, θ, increases. The antenna-to-antenna isolation may be characterized at individually selected distances, D, and/or corresponding angles, θ. The antenna-to-antenna isolation may be characterized by the physical measurement of a difference between the power of an RF signal transmitted from one antenna and the power of the RF signal received by the other antenna. Alternatively, or additionally, the antenna-to-antenna isolation may be determined mathematically. The antenna-to-antenna isolation based on the distance, D, (and/or the angle θ), as characterized by a physical measurement and/or by mathematical calculation, may be stored in a memory of the wireless communication device.

The procedures for radio frequency coexistence described herein may fall into six categories: channel avoidance, aggressor transmitter maximum power backoff; aggressor transmitter blanking; victim receiver/low noise amplifier (LNA) blanking; time division multiplexing; and mutual exclusivity. A wireless communication device may evaluate the use of a pair of antennas and select a first procedure based on the variable distance between the first antenna and the second antenna. In other examples, the distance between the first antenna and the second antenna may be fixed. The wireless communication device may re-evaluate the use of the pair of antennas when the shape of the wireless communication device and/or the distance between the pair of antennas changes.

In channel avoidance, an adaptation made for radio frequency coexistence may be based on a frequency range to be avoided. For example, if a cellular subsystem is or is to be configured to transmit using a first antenna on a given channel X (corresponding to a frequency range Y) at a given time for a given duration, then a WiFi subsystem is or is to be configured to avoid using a second antenna on a given channel L (corresponding to a frequency range that overlaps with frequency range Y) at the given time and for the given duration.

In aggressor transmitter maximum power backoff, an adaptation made for radio frequency coexistence may be based on a magnitude of the backoff. For example, if a first antenna is scheduled to transmit/receive on channel X (corresponding to frequency range Y) and a second antenna is scheduled to receive/transmit in frequency range Y, then an output power of the transmitting aggressor antenna may be backed off (e.g., reduced) by an amount (e.g., a predetermined amount).

In aggressor transmitter blanking, an adaptation made for purposes of radio frequency coexistence may be based on either the duty cycle (e.g., the on/off times) of the aggressor transmitter, or based on a criterion (e.g., a predetermined criterion), such as based on how often aggressor transmitter blanking mitigation is permitted.

In victim receiver/LNA blanking, an adaptation made for radio frequency coexistence may be based on either the duty cycle (e.g., the on/off times) of the receiver/LNA blanking, or on a criterion (e.g., a predetermined criterion), such as on the basis of how often the victim receiver/LNA blanking mitigation is permitted.

As used herein, the terms "blanking" and "blanked" in connection with the transmitter and the receiver/LNA may refer to suppression of an operation of the transmitter and receiver, respectively. By way of example and without limitation, a transmitter may be blanked by removing power from (e.g., turning off) one or more amplification stages or by redirecting an output of the transmitter from an antenna to a load (e.g., to suppress radiation of a transmitter's transmission from the antenna). By way of example and without limitation, a receiver may be blanked by removing power from one or more amplification stages of the receiver, including but not limited to an amplification stage of a low noise amplifier preceding the receiver or integrated with the receiver, or by temporarily inserting an attenuator in-line before the receiver (or the low noise amplifier) (e.g., to suppress radiation received by the antenna from being applied to the input of the receiver or the low noise amplifier). Other ways to blank transmitters and blank receivers are within the scope of the disclosure.

According to some aspects, a processor may perform a radio frequency coexistence mitigation procedure based on a variable distance between a first antenna and a second antenna by being configured to at least one of: blank the transmitter in response to a power of the transmitter exceeding a threshold that is based on the variable distance between the first antenna and the second antenna, or blank the receiver/LNA in response to the power of the transmitter exceeding the threshold that is based on the variable distance between the first antenna and the second antenna. According to some aspects, the threshold may be expressed in units of power (e.g., dBm or milliwatts (mW)). In such aspects, at least one of the transmitter blanking or the receiver/LNA blanking may be used to protect a receiver/LNA from saturation or damage.

According to some aspects, a processor may perform the radio frequency coexistence mitigation procedure based on the variable distance between the first antenna and the second antenna by being configured to: blank the transmitter in response to a first duty cycle (expressed as a percentage) of the transmitter exceeding a first threshold, or blank the receiver in response to a second duty cycle (expressed as a percentage) of the receiver exceeding a second threshold. Each of the first and second duty cycles may refer to an amount of time used for a respective operation as a percentage of available time (e.g., as a percentage of a given time frame). As used herein, each of the first duty cycle and the second duty cycle may be measured (e.g., obtained, calculated) values. Both transmission and reception are permitted, but not required, during the available time over which a duty cycle is measured. Blanking may be triggered by meeting or exceeding a given threshold (e.g., a maximum measured duty cycle). For example, in some aspects, the first threshold may be X and the second threshold may be Y, where X may be a first value and Y may be a second value. In such aspects, X may be equal to Y, X may be greater than Y, or X may be less than Y. Furthermore, X and Y may or may not be related to one another. According to such aspects, the first and second thresholds may be used to meter the times used by the transmitter and receiver in transmitting the first transmission and receiving the second transmission, respectively. The metering may be used, in some examples, to weight the amounts of time available for transmission and reception. Weighting may be used, for example, to ensure equitable use of the available time.

In time-division multiplexing (TDM), the time-division multiplexing may be of such switching time and duration that, to an observer, the aggressor's and victim's use of the band would appear to be concurrent. This appearance of concurrency may be referred to as pseudo-concurrency. The adaptation made for purposes of radio frequency coexistence may be based on the duty cycle (e.g., the on/off times) of this mitigation.

In mutual exclusivity, the exclusive use of the channel is given to either the transmitter (the aggressor) or the receiver (the victim). Mutual exclusivity precludes any concurrency or pseudo-concurrency between the transmitter and the receiver. The adaptation made for purposes of radio frequency coexistence may be based on the duty cycle (e.g., the on/off times) of this mitigation.

Figure 7:
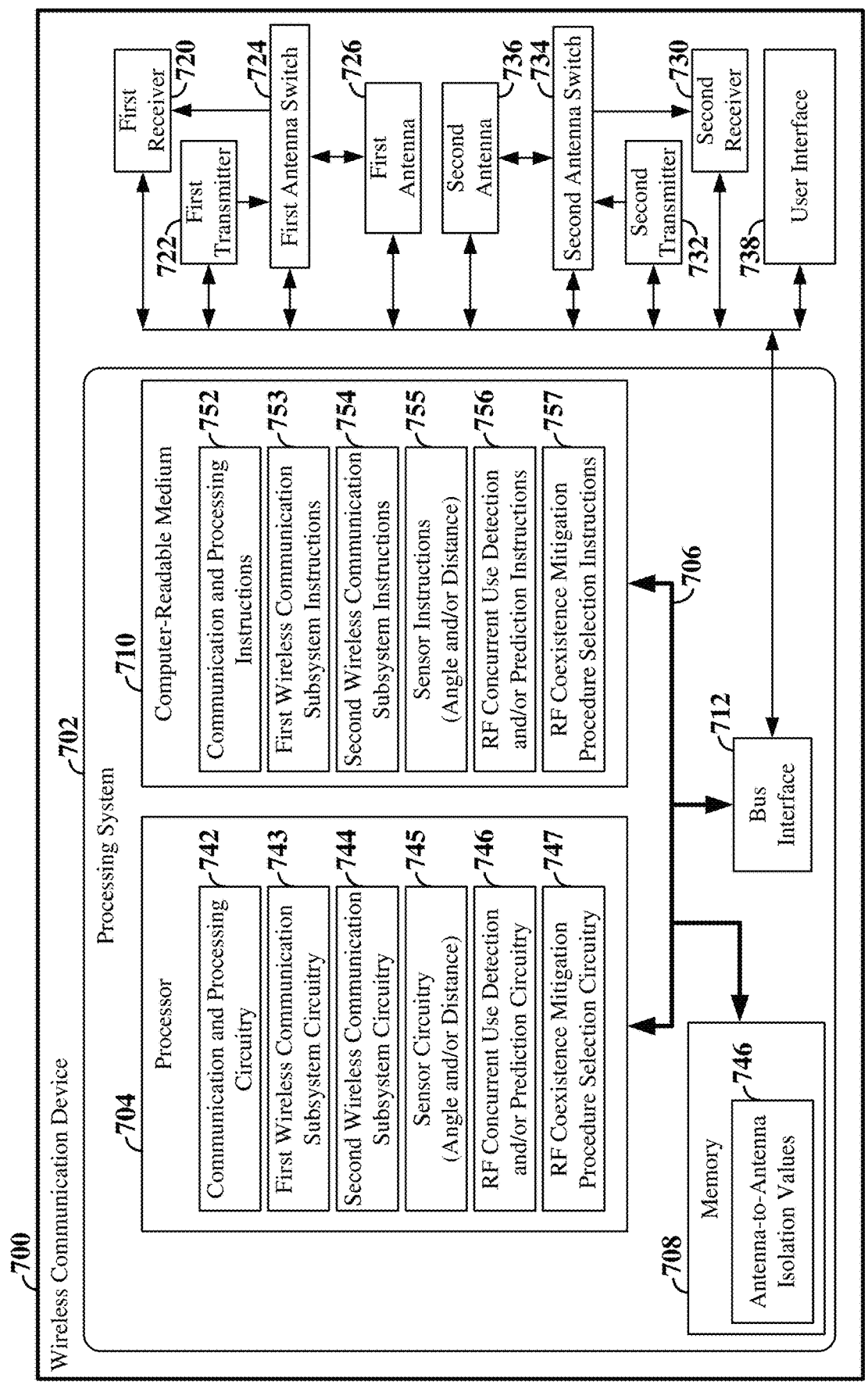
FIG. 7 is a block diagram illustrating an example of a hardware implementation of a wireless communication device employing a processing system according to some aspects.

FIG. 7 is a block diagram illustrating an example of a hardware implementation of a wireless communication device 700 employing a processing system 702 according to some aspects. For example, the wireless communication device 700 may correspond to the wireless communication device 500 as shown and described in reference to FIGS. 5A and 5B, a wireless communication device 600 as shown and described in reference to FIGS. 6A, 6B, and 6C, or any other UE or wireless communication device such as, for example, those shown and described above in reference to FIGS. 1 and/or 2.

The wireless communication device 700 may be implemented with a processing system 702 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 700 may be configured to perform any one or more of the functions described herein. That is, the processor 704, as utilized in the wireless communication device 700, may be used to implement any one or more of the processes and procedures described below.

The processor 704 (e.g., a processor circuit, processor circuitry) may in some instances be implemented via a baseband or modem chip and in other implementations, the processor 704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 702 may be implemented with a bus architecture, represented generally by the bus 706. The bus 706 may include any number of interconnecting buses and bridges depending on the specific application of the processing system 702 and the overall design constraints. The bus 706 links together various circuits including one or more processors (represented generally by the processor 704), a memory 708, and computer-readable media (represented generally by the computer-readable medium 710). The bus 706 may also link various other circuits such as timing sources, peripherals, voltage regulators, and power management circuits, which are well known in the art, and therefore, will not be described any further.

A bus interface 712 provides an interface between the bus 706 and a first receiver 720 (e.g., a first receiver circuit), a first transmitter 722 (e.g., a first transmitter circuit), a first antenna switch 724 (e.g., a first antenna switch circuit), and a first antenna 726. The first receiver 720 may be coupled at its input (e.g., a first receiver RF input port) to an output of the first antenna switch 724 (e.g., a first antenna switch RF output port). The first transmitter 722 may be coupled at its output (e.g., a first transmitter RF output port) to an input of the first antenna switch 724 (e.g., a first antenna switch RF input port). The first antenna 726 may be coupled to an antenna port (e.g., an RF input/output port or node) of the first antenna switch 724. The first antenna switch 724 may be a circuit (e.g., a switch, such as a single pole double throw switch) that selectively couples the antenna port of the first antenna switch 724 (and thereby the first antenna 726) to the first antenna switch RF output port (and thereby to the first receiver RF input port) and the antenna port of the first antenna switch 724 (and thereby the first antenna 726) to the first antenna switch RF input port (and thereby the first transmitter RF output port), respectively.

Returning to the bus interface 712, the bus interface 712 may also provide an interface between the bus 706 and a second receiver 730 (e.g., a second receiver circuit), a second transmitter 732 (e.g., a second transmitter circuit), a second antenna switch 734 (e.g., a second antenna switch circuit), and a second antenna 736. The second receiver 730 may be coupled at its input (e.g., a second receiver RF input port) to an output of the second antenna switch 734 (e.g., a second antenna switch RF output port). The second transmitter 732 may be coupled at its output (e.g., a second transmitter RF output port) to an input of the second antenna switch 734 (e.g., a second antenna switch RF input port). The second antenna 736 may be coupled to an antenna port (e.g., an RF input/output port or node) of the second antenna switch 734. The second antenna switch 734 may be a circuit (e.g., a switch, such as a single pole double throw switch) that selectively couples the antenna port of the second antenna switch 734 (and thereby the second antenna 736) to the second antenna switch RF output port (and thereby to the second receiver RF input port) and the antenna port of the second antenna switch 734 (and thereby the second antenna 736) to the second antenna switch RF input port (and thereby the second transmitter RF output port), respectively.

The description of the first antenna switch 724 and the second antenna switch 734 (where each has a single antenna port, an RF input port, and an RF output port) is exemplary and non-limiting. Antenna switches having any number of antenna ports, RF input ports, and/or RF output ports are within the scope of the disclosure. Furthermore, the disclosure is not limited to the use of antenna switches. For example, a three-port circulator having a first port coupled to the first antenna 726, a second port coupled to the first receiver 720, and a third port coupled to the first transmitter 722 or a multiplexer may be used in place of an antenna switch. Other circuits performing the same or similar functions as an antenna switch, circulator, and/or multiplexer are within the scope of the disclosure.

The first receiver 720, first transmitter 722, first antenna switch 724, and first antenna 726 may provide a first communication interface or a first means for communicating with various other apparatus over a transmission medium (e.g., air interface). The second receiver 730, second transmitter 732, second antenna switch 734, and second antenna 736 may provide a second communication interface or a second means for communicating with various other apparatus over a transmission medium (e.g., air interface).

The bus interface 712 may also provide an interface between the bus 706 and a user interface 738 (e.g., keypad, touch screen keypad enabled display, display, touch screen, speaker, microphone, control knobs, etc.). Of course, such a user interface 738 is optional and may be omitted in some examples.

The processor 704 is responsible for managing the bus 706 and general processing, including executing software stored on the computer-readable medium 710. When executed by the processor 704, the software causes the processing system 702 to perform the various functions described below for any particular apparatus. The computer-readable medium 710 and the memory 708 may also be used to store data manipulated by the processor 704 when executing software. For example, the memory 708 may store one or more antenna-to-antenna isolation values 740. The antenna-to-antenna isolation values 740 may be stored, for example, as a multi-layered table (or a multi-dimensional array in a database). The table (or array) may correlate antenna-to-antenna isolation values with frequencies (e.g., RF frequencies) and either or both of an angle (e.g., 0 as shown and described in reference to FIGS. 5 and 6) and a distance (e.g., D, D', D" as shown and described in reference to FIGS. 5 and 6) that separated a given pair (for example) of antennas at a time of measurement (e.g., if a physical measurement characterized the isolation), or as specified in a calculation (e.g., if the isolation was characterized by mathematical calculation). The antennas for the antenna-to-antenna isolation characterizations may be, for example, first antenna 508 and second antenna 510 of FIG. 5, first antenna 608 and second antenna 610 of FIG. 6, and/or first antenna 726 and second antenna 736 of FIG. 7.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 710.

The computer-readable medium 710 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 710 may reside in the processing system 702, external to the processing system 702, or distributed across multiple entities including the processing system 702. The computer-readable medium 710 may be embodied in a computer program product. By way of example, a computer program product may include a computer-readable medium in packaging materials. In some examples, the computer-readable medium 710 may be part of the memory 708. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include communication and processing circuitry 742, configured to communicate with one or more other wireless communication devices (e.g., other UEs via sidelink (e.g., via PC5 interface), other UEs via a base station (e.g., gNB or eNB via a Uu link employing 4G, LTE, or 5G NR), network access points (e.g., via WiFi IEEE 802.11), machines and/or Internet of Things (IoT) devices (e.g., via LTE, Bluetooth, WiMAX, and/or other wireless communication interfaces), etc.). In some examples, the communication and processing circuitry 742 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 742 may include one or more transmit/receive chains.

In some implementations where the communication involves receiving information, the communication and processing circuitry 742 may obtain information from a component of the wireless communication device 700 (e.g., from the first receiver 720 via the first antenna 726 and/or the second receiver 730 via the second antenna 736) that receives the information via radio frequency signaling or some other type of signaling suitable for the applicable communication medium, processes (e.g., decodes) the information, and outputs the processed information. For example, the communication and processing circuitry 742 may output the information to another component of the processor 704, to the memory 708, or to the bus interface 712. In some examples, the communication and processing circuitry 742 may receive one or more signals, messages, other information, or any combination thereof. In some examples, the communication and processing circuitry 742 may receive information via one or more channels. In some examples, the communication and processing circuitry 742 may include functionality for a means for receiving. In some examples, the communication and processing circuitry 742 may include functionality for a means for processing, including a means for demodulating, a means for decoding, etc.

In some implementations where the communication involves sending (e.g., transmitting) information, the communication and processing circuitry 742 may obtain information (e.g., from another component of the processor 704, the memory 708, or the bus interface 712), process (e.g., modulate, encode, etc.) the information, and output the processed information. For example, the communication and processing circuitry 742 may output the information to the first transmitter 722 to be transmitted via the first antenna 726 and/or the second transmitter 732 to be transmitted via the second antenna 736 (e.g., the first transmitter 722 and second transmitter 732 may transmit respective information via radio frequency signaling or some other type of signaling suitable for the applicable communication medium). In some examples, the communication and processing circuitry 742 may send one or more signals, messages, other information, or any combination thereof. In some examples, the communication and processing circuitry 742 may send information via one or more channels. In some examples, the communication and processing circuitry 742 may include functionality for a means for sending (e.g., a means for transmitting). In some examples, the communication and processing circuitry 742 may include functionality for a means for generating, including a means for modulating, a means for encoding, etc. The communication and processing circuitry 742 may further be configured to execute communication and processing instructions 752 (e.g., software) stored in the computer-readable medium 710 to implement one or more of the functions described herein.

The processor 704 may further include first wireless communication subsystem circuitry 743, configured to process data by, for example, mapping uplink, downlink, flexible, and/or sidelink data to transport channels to physical channels for traffic and signal transmission by, for example, the first transmitter 722 and/or the second transmitter 732. The first wireless communication subsystem circuitry 743, may further be configured, for example, to process data by receiving traffic and signal transmissions at one or more receivers (e.g., first receiver 720 and/or second receiver 730) and mapping uplink, downlink, flexible, and/or sidelink data from the physical channels to transport channels upon reception. The first wireless communication subsystem circuitry 743 may be configured to use a first communication protocol. The first communication protocol may be any communication protocol, such as, for example, 5G (e.g., 5G NR), 4G, LTE, WiFi (IEEE 802.11), Bluetooth, WiMAX (IEEE 802.16), and/or other communication protocols as known to those of skill in the art. According to some aspects, the first transmitter 722 (or the first transmitter 722 and the first receiver 720) may be configured to communicate using a first communication protocol associated with the first wireless communication subsystem circuitry 743. Nothing herein should be construed as preventing the first wireless communication subsystem circuitry 743 from being additionally or alternatively coupled to the second transmitter 732 and/or the second receiver 730. The first wireless communication subsystem circuitry 743 may further be configured to execute first wireless communication subsystem instructions 753 (e.g., software) stored in the computer-readable medium 710 to implement one or more of the functions described herein.

The processor 704 may further include second wireless communication subsystem circuitry 744, configured, for example, to process data by, for example, mapping uplink, downlink, flexible, and/or sidelink data to transport channels to physical channels for traffic and signal transmission by, for example, the first transmitter 722 and/or the second transmitter 732. The second wireless communication subsystem circuitry 744, may further be configured, for example, to process data by receiving traffic and signal transmissions at one or more receivers (e.g., first receiver 720 and/or second receiver 730) and mapping uplink, downlink, flexible, and/or sidelink data from physical channels to transport channels upon reception. The second wireless communication subsystem circuitry 744 may be configured to use a second communication protocol. The second communication protocol may be any communication protocol, such as, for example, 5G (e.g., 5G NR), 4G, LTE, WiFi (IEEE 802.11), Bluetooth, WiMAX (IEEE 802.16), and/or other communication protocols as known to those of skill in the art. The first communication protocol may be different from the second communication protocol. According to some aspects, the second transmitter 732 (or the second transmitter 732 and the second receiver 730) may be coupled to the second wireless communication subsystem circuitry 744. Nothing herein should be construed as preventing the second wireless communication subsystem circuitry 744 from being additionally or alternatively coupled to the first transmitter 722 and/or the first receiver 720. The second wireless communication subsystem circuitry 744 may further be configured to execute second wireless communication subsystem instructions 754 (e.g., software) stored in the computer-readable medium 710 to implement one or more of the functions described herein.

According to one example, the first transmitter 722 may be configured to communicate using a first communication protocol. The first transmitter 722 may be coupled to the first wireless communication subsystem circuitry 743. The second receiver 730 may be configured to communicate using a second protocol, different from the first communication protocol. The second receiver 730 may be coupled to the second wireless communication subsystem circuitry. The second wireless communication subsystem circuitry 744 may be different from the first wireless communication subsystem circuitry 743. In this example, the first antenna 726 may be coupled to the first transmitter 722. The second antenna 736 may be coupled to the second receiver 730. The first antenna 508 and second antenna 510 (of the wireless communication device 500 of FIG. 5) may be coupled to a respective transmitter and receiver in this exemplary configuration. The first antenna 608 and second antenna 610 (of the wireless communication device 600 of FIG. 6) may be coupled to a respective transmitter and receiver in this exemplary configuration. In the example, the second antenna 736 (e.g., 510 of FIG. 5, 610 of FIG. 6) may be physically separated from the first antenna 726 (e.g., 508 of FIG. 5, 608 of FIG. 6) by a variable distance (where examples of instant measures of this variable distance are depicted as D and D' in FIG. 5 and D, D', and D" in FIG. 6).

To obtain the instant measure of the variable distance, the processor 704 may further include sensor circuitry 745, configured, for example, to obtain the instant measure of the variable distance. In one example, the wireless communication device 700 may include a first housing having the first antenna 726 and a second housing having the second antenna 736. The wireless communication device 700 may also include a hinge rotatably coupling the first housing and the second housing. In such a configuration, the sensor circuitry 745 or a component or components of the sensor circuitry 745 may be configured to measure an angle between the first housing and the second housing relative to the hinge. In this example, the processor 704 and the memory 708 may be configured to obtain an instant measure of the variable distance between the first antenna and the second antenna based on the measure of the angle.

According to some aspects, the variable distance may be based on the shape of the wireless communication device 700. An example of a first shape of the wireless communication device 500 (i.e., a possible first example of the wireless communication device 700) may be observed in FIG. 5A. An example of a second shape (e.g., a changed shape) of the wireless communication device 500 may be observed in FIG. 5B. An example of a first shape of the wireless communication device 600 (i.e., a possible alternative example of the wireless communication device 700) may be observed in FIG. 6A.

An example of a second shape (e.g., a changed shape) of the wireless communication device 600 may be observed in FIG. 6B. An example of a third shape (e.g., a next changed shape) of the wireless communication device 600 may be observed in FIG. 6C. The sensor circuitry 745 may further be configured to execute sensor instructions 755 (e.g., software) stored in the computer-readable medium 710 to implement one or more of the functions described herein. In some examples, the sensor instructions 755 may include instructions to obtain the instant measure of the variable distance by converting an angular value (e.g., the measure of the angle θ) to a linear value (e.g., the distance D) based on the output of the sensor and a known first distance between the first antenna and the hinge and a known second distance between the second antenna and the hinge.

The processor 704 may further include radio frequency (RF) concurrent use detection and/or prediction circuitry 746, configured, for example, to detect and/or predict a concurrency in time between a transmission of a first transmission and a reception of a second transmission in a case where, for example, a transmitter (e.g., first transmitter 722) transmits, via the first antenna (e.g., first antenna 726), a first transmission within a first frequency range, and a receiver (e.g., second receiver 730) receives, via the second antenna (e.g., second antenna 736), a second transmission within a second frequency range that overlaps the first frequency range, where, to receive the second transmission, the processor 704 may be configured to perform a radio frequency coexistence mitigation procedure based on a variable distance between the first antenna and the second antenna in response to detection of a concurrency in time between the first transmission and the second transmission. In another example, the radio frequency concurrent use detection and/or prediction circuitry 746, may be configured, for example, to detect and/or predict a radio frequency concurrent use event, where, for example, the first transmitter 722 transmits at a first time for a first duration within a first frequency range from the first antenna 726, and the second receiver 730 receives at a second time at the second antenna 736 within a second frequency range that overlaps the first frequency range. The radio frequency concurrent use detection and/or prediction circuitry 746 may further be configured to execute radio frequency concurrent use detection and/or prediction instructions 756 (e.g., software) stored in the computer-readable medium 710 to implement one or more of the functions described herein.

As used herein, the recited "first frequency range" and "second frequency range" may not correspond to respective predefined bandwidths of respective predefined channels. As used herein, the recited "first frequency range" may include those frequencies outside of the predefined bandwidth of the predefined channel in which noise, intermodulation products, and/or spurious signals, etc. associated with the transmission of the first transmission from the first antenna by the transmitter are found. As used herein, the recited "second frequency range" may include those frequencies outside of the predefined bandwidth of the predefined channel where, for example, the attenuation in the stop bands of a bandpass filter of the receiver and/or the frequency response of the receiver (and/or low noise amplifier) are insufficient to suppress noise, intermodulation products, and/or spurious signals, etc., associated with the transmission of the first transmission from the first antenna by the transmitter from affecting reception of the second transmission by the receiver.

According to one example, the radio frequency coexistence mitigation procedure selection circuitry 747 may configure the processor 704 to obtain a first value corresponding to a radio frequency isolation between the first antenna and the second antenna based on either a second value corresponding to an instant measure of a shape of the wireless communication device, or a third value corresponding to an instant measure of the variable distance between the first antenna and the second antenna, and select the radio frequency coexistence mitigation procedure based on the first value.

According to another example, where a first channel associated with a first communication protocol (and, for example, associated with the first wireless communication subsystem) falls within the first frequency range and a second channel associated with a second communication protocol (and, for example, associated with the second wireless communication subsystem) falls within the second frequency range, the radio frequency coexistence mitigation procedure selection circuitry 747 may configure the processor 704 to avoid a use of the second channel and a number of channels adjacent to the second channel during use of the first channel, where the number of channels adjacent to the second channel is based on the variable distance between the first antenna and the second antenna.

In another example, the radio frequency coexistence mitigation procedure selection circuitry 747 may configure the processor 704 to reduce a power of the transmitter (i.e., the first transmitter 722) to prevent the transmitter from exceeding a maximum transmitted power that is based on the variable distance between the first antenna and the second antenna.

In another example, the radio frequency coexistence mitigation procedure selection circuitry 747 may configure the processor 704 to blank the transmitter in response to a power of the transmitter exceeding threshold that is based on the variable distance between the first antenna and the second antenna, or blank the receiver in response to the power of the transmitter exceeding the threshold that is based on the variable distance between the first antenna and the second antenna.

In another example, the radio frequency coexistence mitigation procedure selection circuitry 747 may configure the processor 704 to time division multiplex periods of transmission in the first frequency range by the transmitter with periods of reception in the second frequency range by the receiver.

In another example, the radio frequency coexistence mitigation procedure selection circuitry 747 may configure the processor 704 to prevent concurrent operation of the transmitter transmitting in the first frequency range and the receiver receiving in the second frequency range.

In another example, the radio frequency coexistence mitigation procedure selection circuitry 747 may configure the processor 704 to selectively activate or deactivate the radio frequency coexistence mitigation procedure based on a shape of the wireless communication device, wherein the variable distance is based on the shape of the wireless communication device.

In another example, the radio frequency coexistence mitigation procedure selection circuitry 747 may configure the processor 704 to blank the first transmitter to, for example, promote a shared use of air resources that may otherwise be occupied by a first transmission made according to a first communication protocol from the first transmitter 722 overlapped with a second transmission made according to a second communication protocol and received by the second receiver 730.

The radio frequency coexistence mitigation procedure selection circuitry 747 may further be configured to execute the radio frequency coexistence mitigation procedure selection instructions 757 (e.g., software) stored in the computer-readable medium 710 to implement one or more of the functions described herein.

Figure 8:
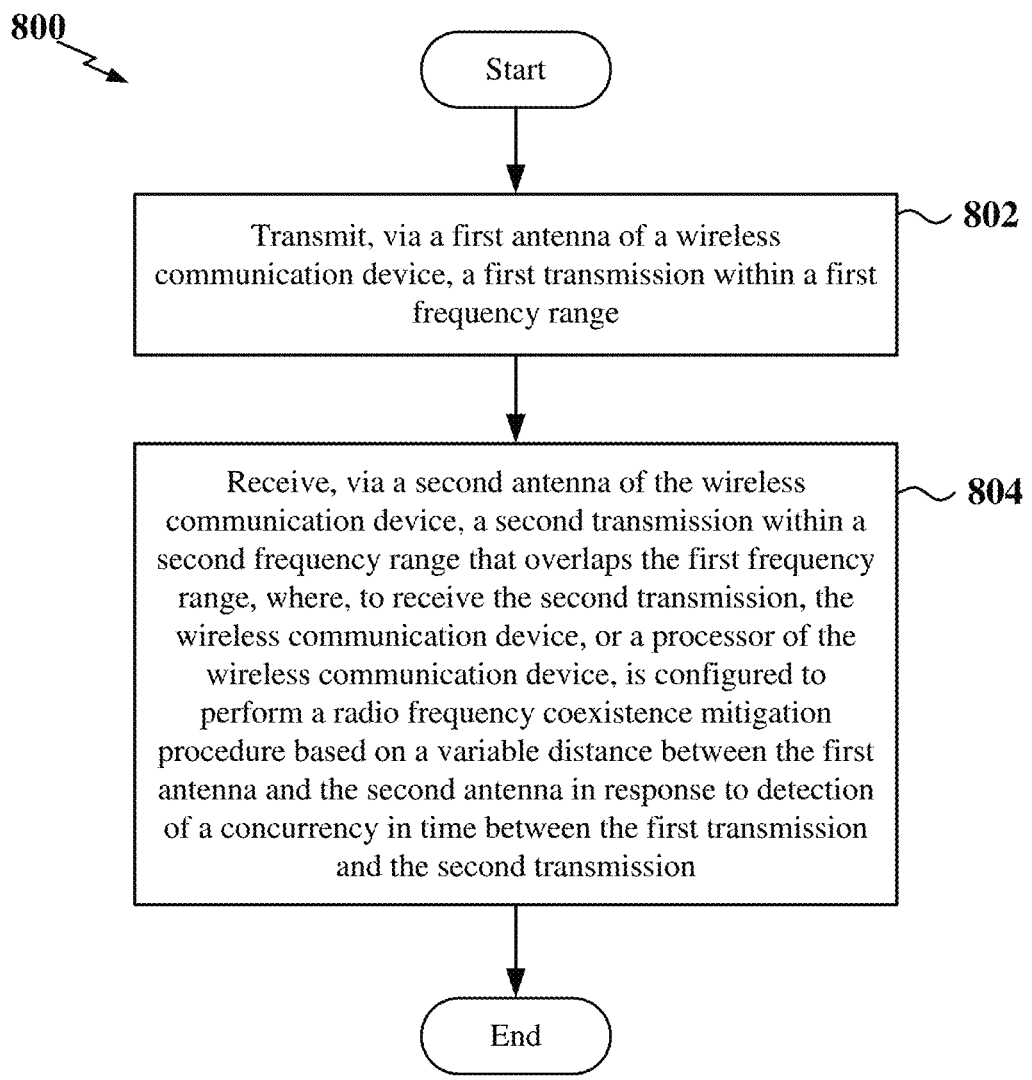
FIG. 8 is a flow chart of an exemplary method of wireless communication at a wireless communication device according to some aspects.

FIG. 8 is a flow chart of an exemplary method of wireless communication 800 at a wireless communication device according to some aspects. The wireless communication device may include a transmitter configured to communicate using a first communication protocol (e.g., associated with a first wireless communication subsystem), a receiver configured to communicate using a second communication protocol (e.g., associated with a second wireless communication subsystem), different from the first communication protocol, a first antenna coupled to the transmitter, a second antenna coupled to the receiver and physically separated from the first antenna by a variable distance, a memory, and a processor coupled to the memory, the transmitter, the receiver, the first antenna, and the second antenna. The first wireless communication subsystem may be different from the second wireless communication subsystem. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 802, the wireless communication device may transmit, via the first antenna, a first transmission within a first frequency range. The transmission of the first transmission may be performed according to the first protocol. For example, the first wireless communication subsystem circuitry 743 in combination with the first transmitter 722 and first antenna 726, shown and described above in connection with FIG. 7, may provide a means for transmitting, via the first antenna, a first transmission within a first frequency range.

At block 804, the wireless communication device may receive, via a second antenna of the wireless communication device, a second transmission within a second frequency range that overlaps the first frequency range, where, to receive the second transmission, the wireless communication device or a processor of the wireless communication device, may be configured to perform a radio frequency coexistence mitigation procedure based on a variable distance between the first antenna and the second antenna in response to detection of a concurrency in time between the first transmission and the second transmission For example, the second wireless communication subsystem circuitry 744 in combination with the second receiver 730 second antenna 736, and the radio frequency concurrent use detection and/or prediction circuitry 746, and/or the radio frequency coexistence mitigation procedure selection circuitry 747 shown and described above in connection with FIG. 7, may provide a means for receiving, via a second antenna of the wireless communication device, a second transmission within a second frequency range that overlaps the first frequency range, where, to receive the second transmission, the wireless communication device, or a processor of the wireless communication device, is configured to perform a radio frequency coexistence mitigation procedure based on a variable distance between the first antenna and the second antenna in response to detection of a concurrency in time between the first transmission and the second transmission.

As indicated above, as used herein, the recited "first frequency range" and "second frequency range" may not correspond to respective predefined bandwidths of respective predefined channels. As used herein, a concurrency in time between the transmission of the first transmission and the reception of the second transmission may occur when transmission of any portion of the first transmission and reception of any portion of the second transmission coincide in time (e.g., overlap in time).

Figure 9:
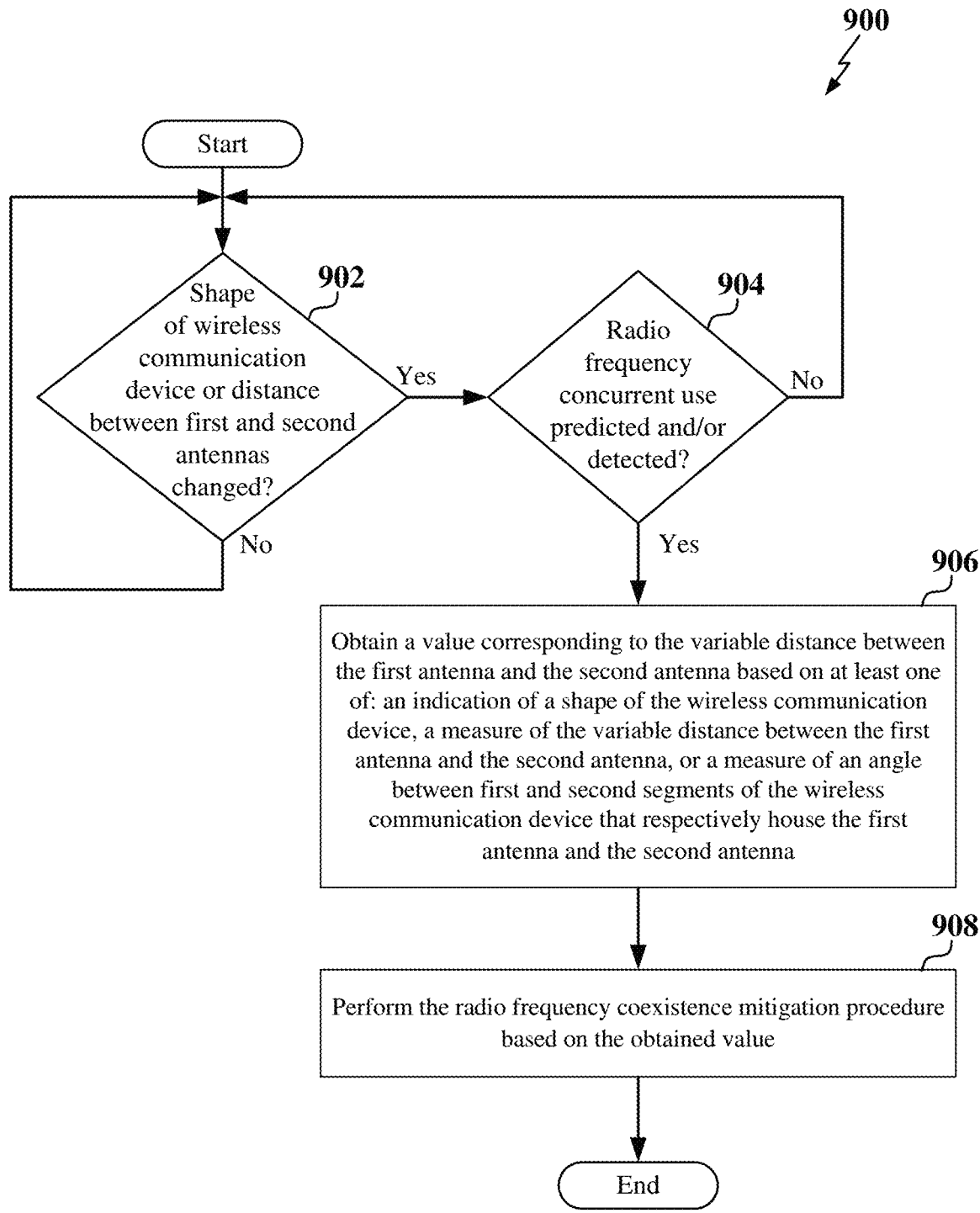
FIG. 9 is a flow chart of an exemplary method of wireless communication at a wireless communication device according to some aspects.

FIG. 9 is a flow chart of an exemplary method of wireless communication 900 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 902, a wireless communication device may determine if a shape of the wireless communication device or a distance between a first antenna and a second antenna of the wireless communication device has changed. If the shape and the distance between the first antenna and the second antenna have not changed, the wireless communication device may periodically return to block 902. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device or the distance between the first antenna and the second antenna of the wireless communication device has changed, then at block 904 the wireless communication device may determine if a radio frequency concurrent use event is detected and/or predicted. If a radio frequency concurrent use event is not detected and/or predicted, the wireless communication device may return to block 902. For example, the radio frequency concurrent use detection and/or prediction circuitry 746 may provide a means for determining if a radio frequency concurrent use event is detected and/or predicted.

If a radio frequency concurrent use event is detected and/or predicted, then at block 906 the wireless communication device may obtain a value corresponding to the variable distance between the first antenna and the second antenna based on at least one of: an indication of a shape of the wireless communication device, a measure of the variable distance between the first antenna and the second antenna, or a measure of an angle between first and second segments of the wireless communication device that respectively house the first antenna and the second antenna. For example, the communication and processing circuitry 742 may provide a means for obtaining a value corresponding to the variable distance between the first antenna and the second antenna based on at least one of: an indication of a shape of the wireless communication device, a measure of the variable distance between the first antenna and the second antenna, or a measure of an angle between first and second segments of the wireless communication device that respectively house the first antenna and the second antenna.

At block 908, the wireless communication device may perform the radio frequency mitigation procedure based on the obtained value. For example, the communication and processing circuitry 742 in combination with the radio frequency coexistence mitigation procedure selection circuitry 747 may provide a means for perform the radio frequency mitigation procedure based on the obtained value.

Figure 10:
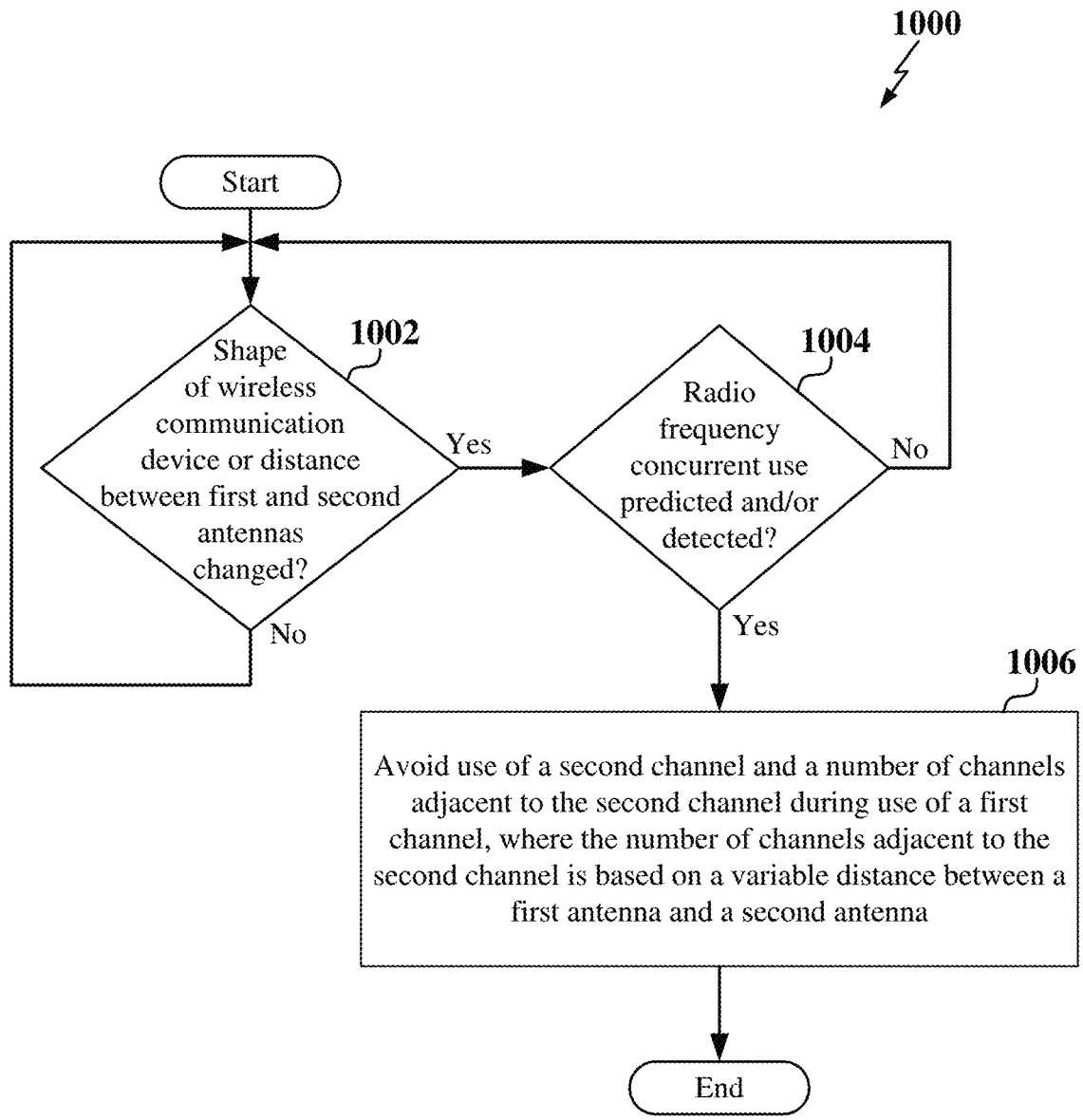
FIG. 10 is a flow chart of an exemplary method of wireless communication at a wireless communication device according to some aspects.

FIG. 10 is a flow chart of an exemplary method of wireless communication 1000 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1002, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1002. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1004 the wireless communication device may determine if a radio frequency concurrent use event is detected and/or predicted. If a radio frequency concurrent use event is not detected and/or predicted, the wireless communication device may return to block 1002. For example, the radio frequency concurrent use detection and/or prediction circuitry 746 may provide a means for determining if a radio frequency concurrent use event is detected and/or predicted.

If a radio frequency concurrent use event is detected and/or predicted, and where a first channel associated with a first communication protocol and a first wireless communication subsystem falls within the first frequency range, and a second channel associated with a second communication protocol and a second wireless communication subsystem falls within the second frequency range, then at block 1006 the wireless communication device may avoid the use of the second channel and a number of channels adjacent to the second channel during use of the first channel, where the number of channels adjacent to the second channel may be based on the variable distance between a first antenna and a second antenna. For example, the communication and processing circuitry 742 may provide a means for avoiding the use of a second channel and a number of channels adjacent to the second channel during use of a first channel, where the number of channels adjacent to the second channel may be based on the variable distance between a first antenna and a second antenna.

Figure 11:
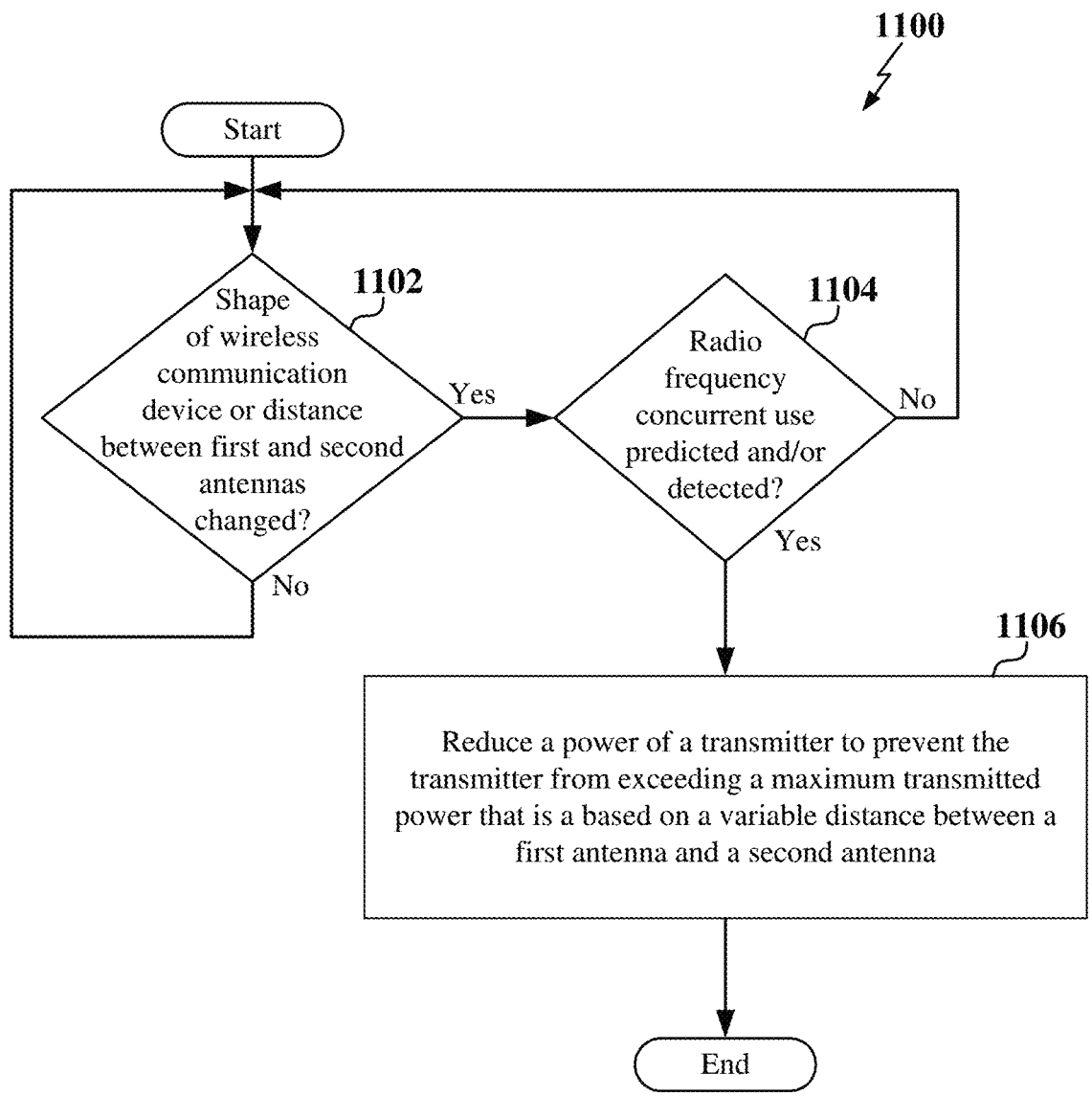
FIG. 11 is a flow chart of an exemplary method of wireless communication at a wireless communication device according to some aspects.

FIG. 11 is a flow chart of an exemplary method of wireless communication 1100 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1102, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1102. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1104 the wireless communication device may determine if a radio frequency concurrent use event is detected and/or predicted. If a radio frequency concurrent use event is not detected and/or predicted, the wireless communication device may return to block 1102. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1106 the wireless communication device may reduce a power of a transmitter to prevent the transmitter from exceeding a maximum transmitted power that may be based on a variable distance between a first antenna and a second antenna. For example, the communication and processing circuitry 742 in combination with the first transmitter 722 may provide a means for reducing a power of a transmitter to prevent the transmitter from exceeding a maximum transmitted power that may be based on a variable distance between a first antenna and a second antenna.

Figure 12:
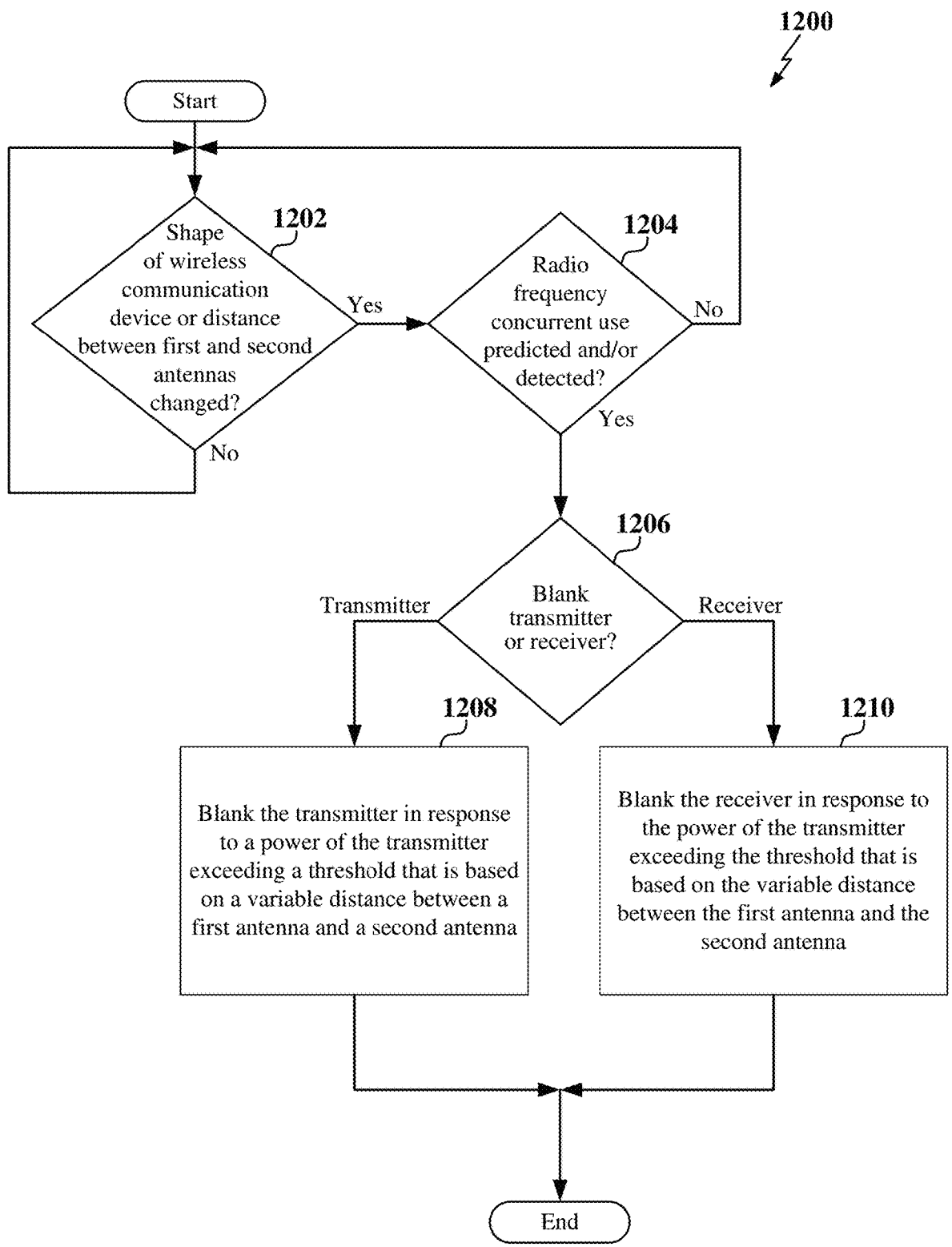
FIG. 12 is a flow chart of an exemplary method of wireless communication at a wireless communication device according to some aspects.

FIG. 12 is a flow chart of an exemplary method of wireless communication 1200 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1202, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1202. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1204 the wireless communication device may determine if a radio frequency concurrent use event is detected and/or predicted. If a radio frequency concurrent use event is not detected and/or predicted, the wireless communication device may return to block 1202. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1206 the wireless communication device may determine whether to blank a transmitter or a receiver. For example, the communication and processing circuitry 742 may provide a means for determining whether to blank a transmitter or a receiver.

If, at block 1206, the determination is made to blank the transmitter, then at block 1208, the wireless communication device may blank the transmitter in response to a power of the transmitter exceeding a threshold that is based on the variable distance between the first antenna and the second antenna. For example, the communication and processing circuitry 742 in combination with the first transmitter 722 may provide a means for blanking the transmitter in response to a power of the transmitter exceeding a threshold that is based on the variable distance between the first antenna and the second antenna.

However, if, at block 1206, the determination is made to blank the receiver, then at block 1210, the wireless communication device may blank the receiver in response to the power of the transmitter exceeding the threshold that is based on the variable distance between the first antenna and the second antenna. For example, the communication and processing circuitry 742 in combination with the second receiver 730 may provide a means for blanking the receiver in response to the power of the transmitter exceeding the threshold that is based on the variable distance between the first antenna and the second antenna.

Figure 13:
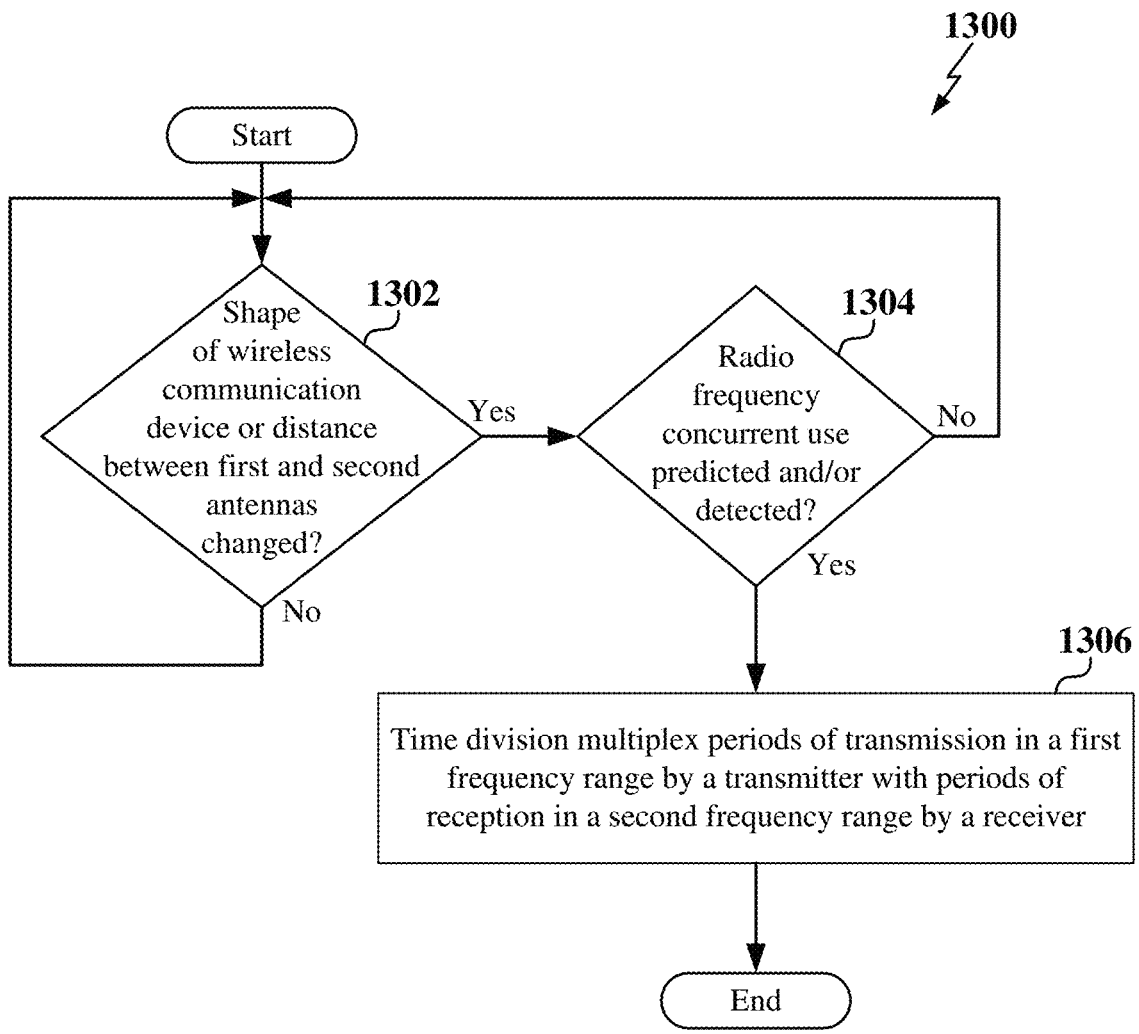
FIG. 13 is a flow chart of an exemplary method of wireless communication at a wireless communication device according to some aspects.

FIG. 13 is a flow chart of an exemplary method of wireless communication 1300 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1302, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1302. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1304 the wireless communication device may determine if a radio frequency concurrent use event is detected and/or predicted. If a radio frequency concurrent use event is not detected and/or predicted, the wireless communication device may return to block 1302. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1306 the wireless communication device may time division multiplex periods of transmission in a first frequency range by a transmitter with periods of reception in a second frequency range by a receiver. For example, the communication and processing circuitry 742 combined with the first transmitter 722 and the second receiver 730 may provide a means for time division multiplexing periods of transmission in a first frequency range by a transmitter with periods of reception in a second frequency range by a receiver.

Figure 14:
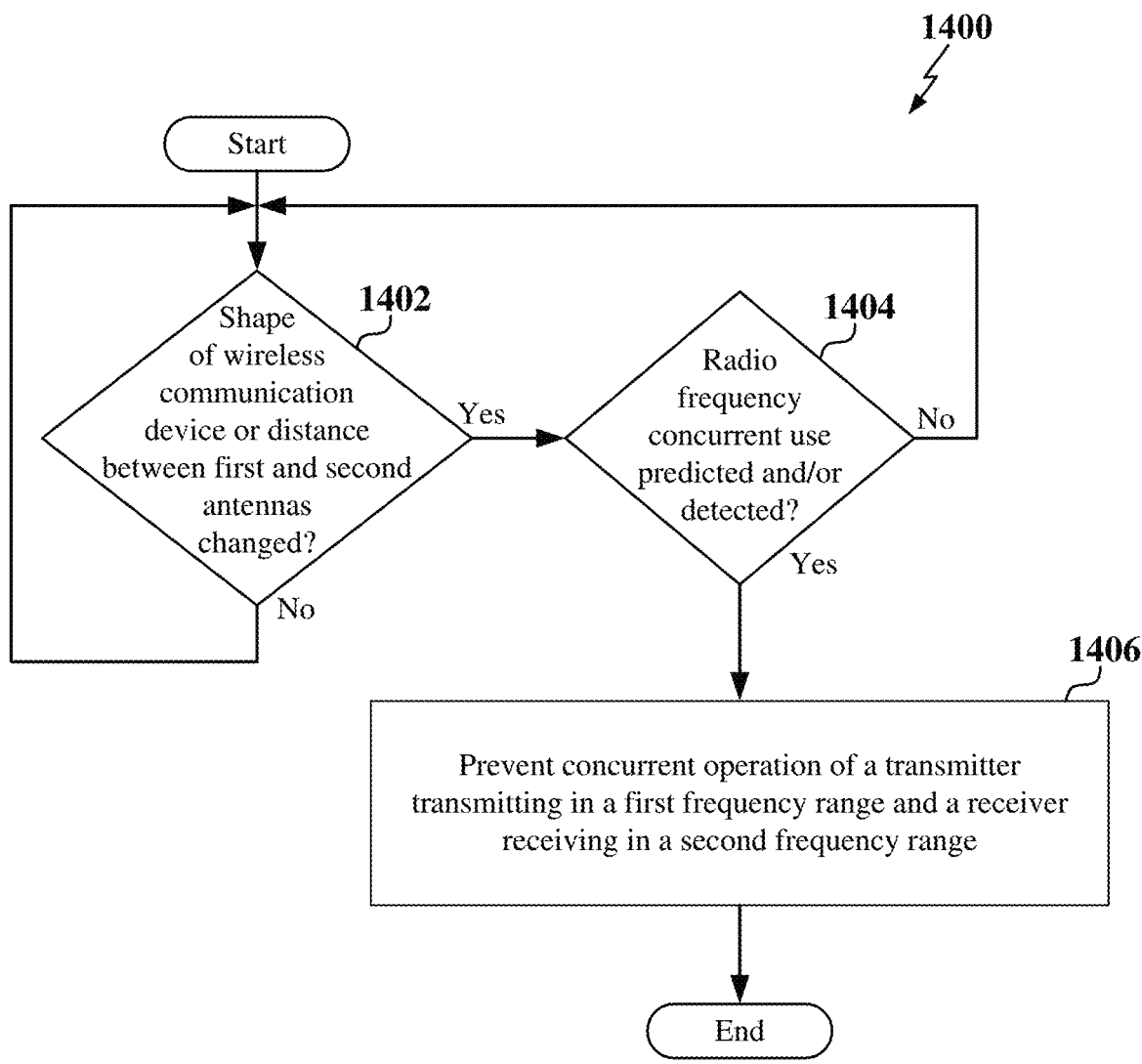
FIG. 14 is a flow chart of an exemplary method of wireless communication at a wireless communication device according to some aspects.

FIG. 14 is a flow chart of an exemplary method of wireless communication 1400 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1402, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1402. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1404 the wireless communication device may determine if a radio frequency concurrent use event is detected and/or predicted. If a radio frequency concurrent use event is not detected and/or predicted, the wireless communication device may return to block 1402. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1406 the wireless communication device may prevent concurrent operation of a transmitter transmitting in a first frequency range and a receiver receiving in a second frequency range. For example, the communication and processing circuitry 742, in combination with the first transmitter 722 and the second receiver 730 may provide a means for preventing concurrent operation of a transmitter transmitting in a first frequency range and a receiver receiving in a second frequency range.

Figure 15:
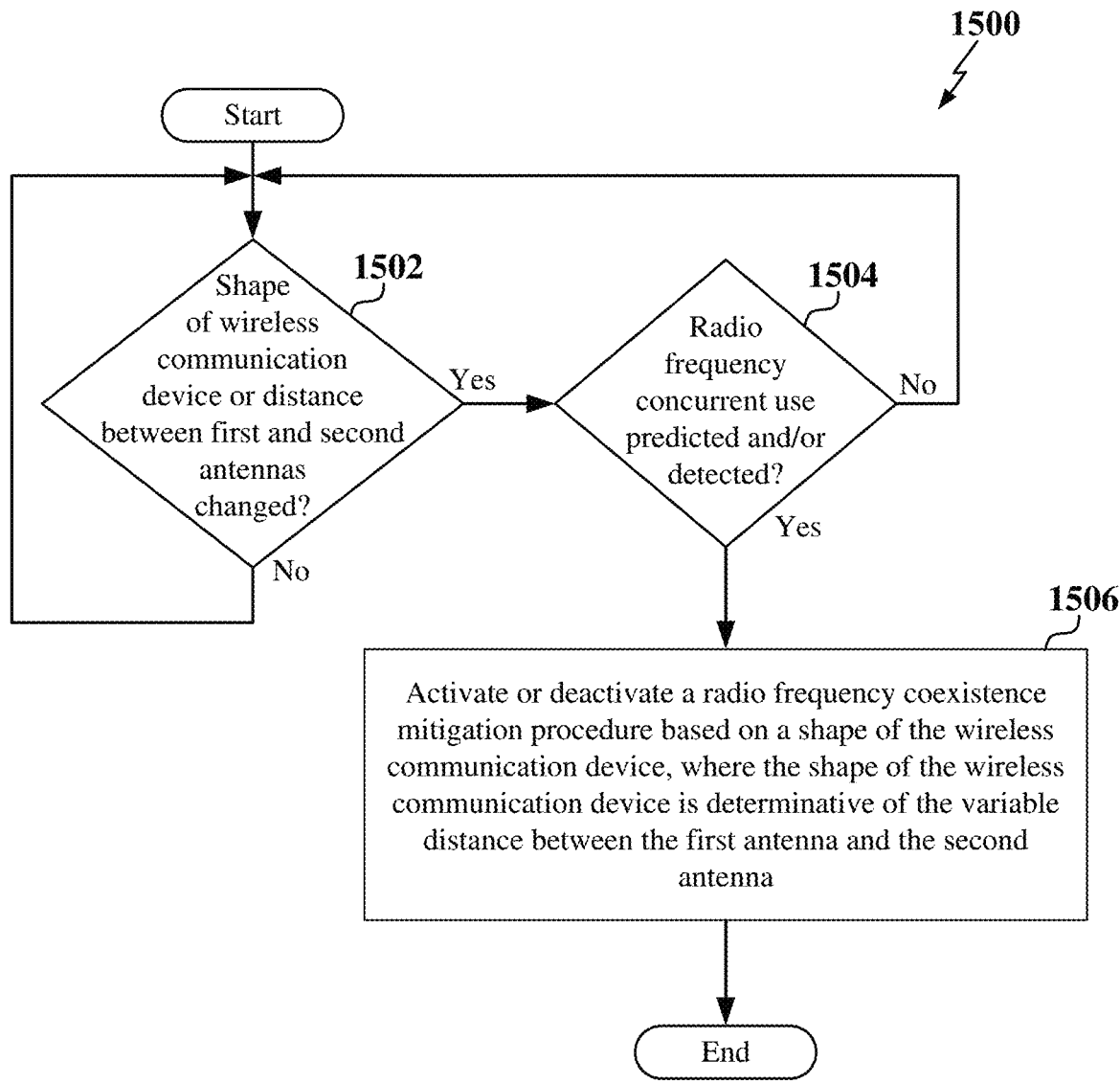
FIG. 15 is a flow chart of an exemplary method of wireless communication at a wireless communication device according to some aspects.

FIG. 15 is a flow chart of an exemplary method of wireless communication 1500 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1502, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1502. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1504 the wireless communication device may determine if a radio frequency concurrent use event is detected and/or predicted. If a radio frequency concurrent use event is not detected and/or predicted, the wireless communication device may return to block 1502. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1506 the wireless communication device may activate or deactivate (e.g., selectively activate or deactivate) the radio frequency coexistence mitigation procedure based on a shape of the wireless communication device, where the shape of the wireless communication device is determinative of the variable distance between the first antenna and the second antenna. For example, the communication and processing circuitry 742 in combination with the sensor circuitry 745 may provide a means for activating or deactivating the radio frequency coexistence mitigation procedure based on a shape of the wireless communication device, where the shape of the wireless communication device is determinative of the variable distance between the first antenna and the second antenna.

Figure 16:
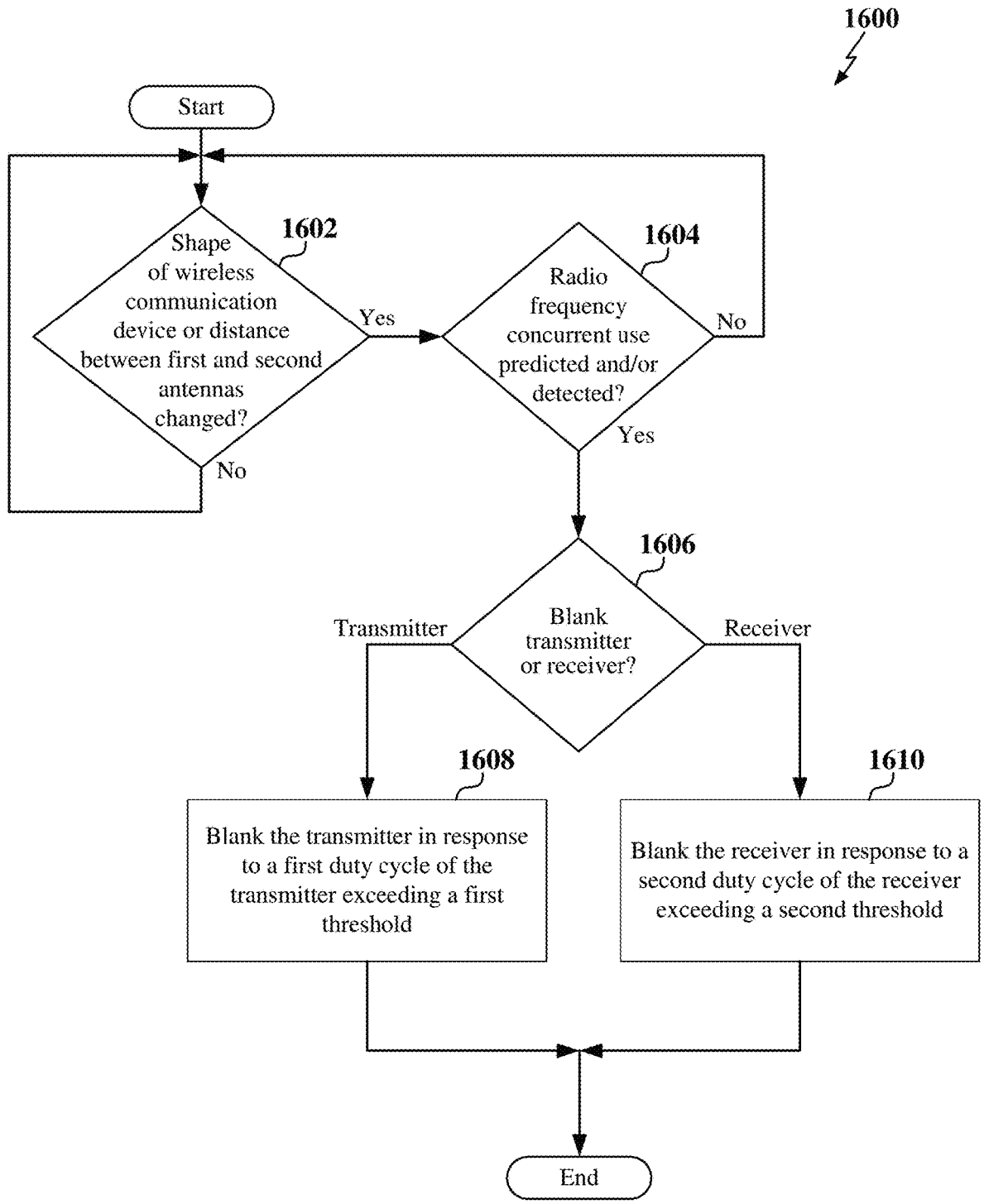
FIG. 16 is a flow chart of an exemplary method of wireless communication at a wireless communication device according to some aspects.

FIG. 16 is a flow chart of an exemplary method of wireless communication 1600 at a wireless communication device according to some aspects. As described below, some or all illustrated features may be omitted in a particular implementation within the scope of the present disclosure, and some illustrated features may not be required for implementation of all examples. In some examples, the method may be performed by the wireless communication device 700, as described above and illustrated in FIG. 7, by a processor or processing system, or by any suitable means for carrying out the described functions.

At block 1602, a wireless communication device may determine if a shape of the wireless communication device or a distance between a first antenna and a second antenna of the wireless communication device has changed. If the shape of the wireless communication device and the distance between the first antenna and the second antenna have not changed, the wireless communication device may periodically return to block 1602. For example, the communication and processing circuitry 742 in combination with the sensor circuitry 745 may provide a means for determining if a shape of the wireless communication device or a distance between a first antenna and a second antenna of the wireless communication device has changed.

If the shape of the wireless communication device, or the distance between the first antenna and the second antenna of the wireless communication device, has changed, then at block 1604 the wireless communication device may determine if a radio frequency concurrent use event is detected and/or predicted. If a radio frequency concurrent use event is not detected and/or predicted, the wireless communication device may return to block 1602. For example, the radio frequency concurrent use detection and/or prediction circuitry 746 may provide a means for determining if a radio frequency concurrent use event is detected and/or predicted.

If a radio frequency concurrent use event is detected and/or predicted, then at block 1606 the wireless communication device may determine whether to blank a transmitter or a receiver. For example, the communication and processing circuitry 742 may provide a means for determining whether to blank a transmitter or a receiver.

If, at block 1606, the determination is made to blank the transmitter, then at block 1608, the wireless communication device may blank the transmitter in response to a first duty cycle of the transmitter exceeding a first threshold. For example, the communication and processing circuitry 742 in combination with the first transmitter 722 may provide a means for blanking the transmitter in response to a first duty cycle of the transmitter exceeding a first threshold. In some examples, the first threshold may be based on the variable distance between the first antenna and the second antenna.

However, if, at block 1606, the determination is made to blank the receiver, then at block 1610, the wireless communication device may blank the receiver in response to a second duty cycle of the receiver exceeding a second threshold. In some examples, the second threshold may be based on the variable distance between the first antenna and the second antenna. For example, the communication and processing circuitry 742 in combination with the second receiver 730 may provide a means for blanking the receiver in response to a second duty cycle of the receiver exceeding a second threshold.

Of course, in the above examples, the circuitry included in the processor 704 is merely provided as an example, and other means for carrying out the described functions may be included within various aspects of the present disclosure, including but not limited to the instructions stored in the computer-readable medium 710, or any other suitable apparatus or means described in any one of the FIG. 1, 2, 5, 6, or 7, and utilizing, for example, the processes and/or algorithms described herein in relation to FIGS. 8-16.

The processes shown in FIGS. 8-16 may include additional aspects, such as any single aspect or any combination of aspects described below and/or in connection with one or more other processes described elsewhere herein.

Aspect 1: A wireless communication device, comprising: a transmitter configured to communicate using a first communication protocol, a receiver configured to communicate using a second communication protocol, different from the first communication protocol, a first antenna coupled to the transmitter, a second antenna coupled to the receiver and physically separated from the first antenna by a variable distance, a memory, and a processor communicatively coupled to the memory, the transmitter, the receiver, the first antenna, and the second antenna, wherein the processor is configured to: transmit, via the first antenna, a first transmission within a first frequency range, and receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission.

Aspect 2: The wireless communication device of aspect 1, wherein the variable distance is based on a shape of the wireless communication device.

Aspect 3: The wireless communication device of aspect 1 or 2, wherein the processor is configured to: obtain a value corresponding to the variable distance between the first antenna and the second antenna based on at least one of: an indication of a shape of the wireless communication device, a measure of the variable distance between the first antenna and the second antenna, or a measure of an angle between first and second segments of the wireless communication device that respectively house the first antenna and the second antenna, and perform the radio frequency coexistence mitigation procedure based on the obtained value.

Aspect 4: The wireless communication device of any of aspects 1 through 3, wherein a first channel associated with the first communication protocol falls within the first frequency range, a second channel associated with the second communication protocol falls within the second frequency range, and wherein to perform the radio frequency coexistence mitigation procedure based on the variable distance between the first antenna and the second antenna, the processor is configured to: avoid use of the second channel and a number of channels adjacent to the second channel during use of the first channel, wherein the number of channels adjacent to the second channel is based on the variable distance between the first antenna and the second antenna.

Aspect 5: The wireless communication device of any of aspects 1 through 4, wherein to perform the radio frequency coexistence mitigation procedure based on the variable distance between the first antenna and the second antenna, the processor is configured to: reduce a power of the transmitter to prevent the transmitter from exceeding a maximum transmitted power that is based on the variable distance between the first antenna and the second antenna.

Aspect 6: The wireless communication device of any of aspects 1 through 5, wherein to perform the radio frequency coexistence mitigation procedure based on the variable distance between the first antenna and the second antenna, the processor is configured to at least one of: blank the transmitter in response to a power of the transmitter exceeding a threshold that is based on the variable distance between the first antenna and the second antenna, or blank the receiver in response to the power of the transmitter exceeding the threshold that is based on the variable distance between the first antenna and the second antenna.

Aspect 7: The wireless communication device of any of aspects 1 through 6, wherein to perform the radio frequency coexistence mitigation procedure based on the variable distance between the first antenna and the second antenna, the processor is configured to: time division multiplex periods of transmission in the first frequency range by the transmitter with periods of reception in the second frequency range by the receiver.

Aspect 8: The wireless communication device of any of aspects 1 through 7, wherein to perform the radio frequency coexistence mitigation procedure based on the variable distance between the first antenna and the second antenna, the processor is configured to: prevent concurrent operation of the transmitter in the first frequency range and operation of the receiver in the second frequency range.

Aspect 9: The wireless communication device of any of aspects 1 through 8, wherein the processor is configured to activate or deactivate the radio frequency coexistence mitigation procedure based on a shape of the wireless communication device, wherein the shape of the wireless communication device is determinative of the variable distance between the first antenna and the second antenna.

Aspect 10: The wireless communication device of any of aspects 1 through 9, wherein to perform the radio frequency coexistence mitigation procedure based on the variable distance between the first antenna and the second antenna the processor is configured to: blank the transmitter in response to a first duty cycle of the transmitter exceeding a first threshold, or blank the receiver in response to a second duty cycle of the receiver exceeding a second threshold.

Aspect 11: The wireless communication device of any of aspects 1 through 10, further comprising: a first housing comprising the first antenna, and a second housing comprising the second antenna.

Aspect 12: The wireless communication device of aspect 11, further comprising: a hinge rotatably coupling the first housing and the second housing, and a sensor communicatively coupled to the processor, wherein the sensor is configured to generate measurement information indicative of an angle between the first housing and the second housing relative to the hinge, and wherein the processor is configured to: obtain the variable distance between the first antenna and the second antenna based on the measurement information.

Aspect 13: The wireless communication device of any of aspects 1 through 12, wherein the first housing is releasably coupled to the second housing.

Aspect 14: A method of wireless communication at a wireless communication device, comprising: transmitting, via a first antenna, a first transmission within a first frequency range, and receiving, via a second antenna, a second transmission within a second frequency range that overlaps the first frequency range, wherein, to receive the second transmission, the method includes: performing a radio frequency coexistence mitigation procedure based on a variable distance between the first antenna and the second antenna in response to detection of a concurrency in time between the first transmission and the second transmission.

Aspect 15: The method of aspect 14, further comprising: obtaining a value corresponding to the variable distance between the first antenna and the second antenna based on at least one of: an indication of a shape of the wireless communication device, a measure of the variable distance between the first antenna and the second antenna, or a measure of an angle between first and second segments of the wireless communication device that respectively house the first antenna and the second antenna, and performing the radio frequency coexistence mitigation procedure based on the obtained value.

Aspect 16: The method of aspect 14 or 15, wherein a first channel associated with a first communication protocol falls within the first frequency range and a second channel associated with a second communication protocol falls within the second frequency range, and wherein to perform the radio frequency coexistence mitigation procedure based on the variable distance between the first antenna and the second antenna, the method further comprises: avoiding use of the second channel and a number of channels adjacent to the second channel during use of the first channel, wherein the number of channels adjacent to the second channel is based on the variable distance between the first antenna and the second antenna.

Aspect 17: The method of any of aspects 14 through 16, wherein to perform the radio frequency coexistence mitigation procedure based on the variable distance between the first antenna and the second antenna, the method further comprises: reducing a power of the transmitter to prevent the transmitter from exceeding a maximum transmitted power that is based on the variable distance between the first antenna and the second antenna.

Aspect 18: The method of any of aspects 14 through 17, wherein to perform the radio frequency coexistence mitigation procedure based on the variable distance between the first antenna and the second antenna, the method further comprises: blanking the transmitter in response to a power of the transmitter exceeding a threshold that is based on the variable distance between the first antenna and the second antenna, or blanking the receiver in response to the power of the transmitter exceeding the threshold that is based on the variable distance between the first antenna and the second antenna.

Aspect 19: The method of any of aspects 14 through 18, wherein to perform the radio frequency coexistence mitigation procedure based on the variable distance between the first antenna and the second antenna, the method further comprises: time division multiplexing periods of transmission in the first frequency range by the transmitter with periods of reception in the second frequency range by the receiver.

Aspect 20: The method of any of aspects 14 through 19, wherein to perform the radio frequency coexistence mitigation procedure based on the variable distance between the first antenna and the second antenna, the method further comprises: preventing concurrent operation of the transmitter in the first frequency range and operation of the receiver in the second frequency range.

Aspect 21: The method of any of aspects 14 through 20, wherein to perform the radio frequency coexistence mitigation procedure based on the variable distance between the first antenna and the second antenna the method further comprises: activating or deactivating the radio frequency coexistence mitigation procedure based on a shape of the wireless communication device, wherein the shape of the wireless communication device is determinative of the variable distance between the first antenna and the second antenna.

Aspect 22: The method of any of aspects 14 through 21, wherein to perform the radio frequency coexistence mitigation procedure based on the variable distance between the first antenna and the second antenna the method further comprises: blanking the transmitter in response to a first duty cycle of the transmitter exceeding a first threshold, or blanking the receiver in response to a second duty cycle of the receiver exceeding a second threshold.

Aspect 23: A wireless communication device, comprising: means for transmitting, via a first antenna, a first transmission within a first frequency range, and means for receiving, via a second antenna, a second transmission within a second frequency range that overlaps the first frequency range, wherein, to receive the second transmission, the wireless communication device further includes: means for performing a radio frequency coexistence mitigation procedure based on a variable distance between the first antenna and the second antenna in response to detection of a concurrency in time between the first transmission and the second transmission.

Aspect 24. The wireless communication device of aspect 23, further comprising: means for obtaining a value corresponding to the variable distance between the first antenna and the second antenna based on at least one of: an indication of a shape of the wireless communication device, a measure of the variable distance between the first antenna and the second antenna, or a measure of an angle between first and second segments of the wireless communication device that respectively house the first antenna and the second antenna, and means for performing the radio frequency coexistence mitigation procedure based on the obtained value.

Aspect 25. The wireless communication device of aspect 23 or 24, wherein to perform the radio frequency coexistence mitigation procedure based on the variable distance between the first antenna and the second antenna the wireless communication device further comprises: means for reducing a power of the means for transmitting to prevent the means for transmitting from exceeding a maximum transmitted power that is based on the variable distance between the first antenna and the second antenna.

Aspect 26. The wireless communication device of any of aspects 23 through 25, wherein to perform the radio frequency coexistence mitigation procedure based on the variable distance between the first antenna and the second antenna the wireless communication device further comprises: means for blanking the means for transmitting in response to a power of the means for transmitting exceeding a threshold that is based on the variable distance between the first antenna and the second antenna, or means for blanking the means for receiving in response to the power of the means for transmitting exceeding the threshold that is based on the variable distance between the first antenna and the second antenna.

Aspect 27. The wireless communication device of any of aspects 23 through 26, wherein to perform the radio frequency coexistence mitigation procedure based on the variable distance between the first antenna and the second antenna the wireless communication device further comprises: means for time division multiplexing periods of transmission in the first frequency range by the means for transmitting with periods of reception in the second frequency range by the means for receiving.

Aspect 28. The wireless communication device of any of aspects 23 through 27, wherein to perform the radio frequency coexistence mitigation procedure based on the variable distance between the first antenna and the second antenna the wireless communication device further comprises: means for preventing concurrent operation of the means for transmitting in the first frequency range and the means for receiving in the second frequency range.

Aspect 29. The wireless communication device of any of aspects 23 through 28, wherein to perform the radio frequency coexistence mitigation procedure based on the variable distance between the first antenna and the second antenna the wireless communication device further comprises: means for activating or deactivating the radio frequency coexistence mitigation procedure based on a shape of the wireless communication device, wherein the shape of the wireless communication device is determinative of the variable distance between the first antenna and the second antenna.

Aspect 30. The wireless communication device of any of aspects 23 through 29, wherein to perform the radio frequency coexistence mitigation procedure based on the variable distance between the first antenna and the second antenna the wireless communication device further comprises: means for blanking the means for transmitting in response to a first duty cycle of the means for transmitting exceeding a first threshold, or means for blanking the means for receiving in response to a second duty cycle of the means for receiving exceeding a second threshold.

Aspect 31: A non-transitory computer-readable medium storing computer-executable code, comprising code for causing an apparatus to perform a method of any one of aspects 14 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 6, and/or 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. Additionally, a phrase referring to "A and/or B" is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

What is claimed is:

1. A wireless communication device, comprising:
   a transmitter configured to communicate according to a first communication protocol;
   a receiver configured to communicate according to a second communication protocol that is different from the first communication protocol;
   a first antenna coupled to the transmitter;
   a second antenna coupled to the receiver and physically separated from the first antenna by a variable distance;
   a memory; and
   a processor coupled to the memory, the transmitter, the receiver, the first antenna, and the second antenna, wherein the processor is configured to:
   transmit, via the first antenna, a first transmission within a first frequency range; and
   receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission, wherein a first channel associated with the first communication protocol falls within the first frequency range, wherein a second channel associated with the second communication protocol falls within the second frequency range, and wherein to perform the radio frequency coexistence mitigation procedure based on the variable distance between the first antenna and the second antenna, the processor is configured to:
   avoid use of the second channel and a number of channels adjacent to the second channel during use of the first channel, wherein the number of channels adjacent to the second channel is based on the variable distance between the first antenna and the second antenna.

2. The wireless communication device of claim 1, wherein the variable distance is based on a shape of the wireless communication device.

3. The wireless communication device of claim 1, wherein the processor is configured to:
   obtain a value corresponding to the variable distance between the first antenna and the second antenna based on at least one of: an indication of a shape of the wireless communication device, the variable distance between the first antenna and the second antenna, or an angle between first and second segments of the wireless communication device that respectively house the first antenna and the second antenna; and perform the radio frequency coexistence mitigation procedure based on the obtained value.

4. The wireless communication device of claim 1, wherein to perform the radio frequency coexistence mitigation procedure based on the variable distance between the first antenna and the second antenna, the processor is configured to:

reduce a power of the transmitter to prevent the transmitter from exceeding a maximum transmitted power that is based on the variable distance between the first antenna and the second antenna.

5. The wireless communication device of claim 1, wherein to perform the radio frequency coexistence mitigation procedure based on the variable distance between the first antenna and the second antenna, the processor is configured to:

time division multiplex periods of transmission in the first frequency range by the transmitter with periods of reception in the second frequency range by the receiver.

6. The wireless communication device of claim 1, wherein to perform the radio frequency coexistence mitigation procedure based on the variable distance between the first antenna and the second antenna, the processor is configured to:

prevent concurrent operation of the transmitter in the first frequency range and operation of the receiver in the second frequency range.

7. The wireless communication device of claim 1, wherein the processor is configured to activate or deactivate the radio frequency coexistence mitigation procedure based on a shape of the wireless communication device, wherein the shape of the wireless communication device is determinative of the variable distance between the first antenna and the second antenna.

8. A wireless communication device, comprising:
a transmitter configured to communicate according to a first communication protocol;
a receiver configured to communicate according to a second communication protocol that is different from the first communication protocol;
a first antenna coupled to the transmitter;
a second antenna coupled to the receiver and physically separated from the first antenna by a variable distance;
a memory; and
a processor coupled to the memory, the transmitter, the receiver, the first antenna, and the second antenna, wherein the processor is configured to:
transmit, via the first antenna, a first transmission within a first frequency range; and
receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission, wherein to perform the radio frequency coexistence mitigation procedure based on the variable distance between the first antenna and the second antenna, the processor is configured to at least one of:

blank the transmitter in response to a power of the transmitter exceeding a threshold that is based on the variable distance between the first antenna and the second antenna, or blank the receiver in response to the power of the transmitter exceeding the threshold that is based on the variable distance between the first antenna and the second antenna.

9. The wireless communication device of claim 8, wherein to perform the radio frequency coexistence mitigation procedure based on the variable distance between the first antenna and the second antenna, the processor is configured to:

blank the transmitter in response to the power of the transmitter exceeding the threshold that is based on the variable distance between the first antenna and the second antenna.

10. The wireless communication device of claim 9, wherein to perform the radio frequency coexistence mitigation procedure based on the variable distance between the first antenna and the second antenna, the processor is configured to:

blank the receiver in response to the power of the transmitter exceeding the threshold that is based on the variable distance between the first antenna and the second antenna.

11. The wireless communication device of claim 8, wherein to perform the radio frequency coexistence mitigation procedure based on the variable distance between the first antenna and the second antenna, the processor is configured to:

blank the receiver in response to the power of the transmitter exceeding the threshold that is based on the variable distance between the first antenna and the second antenna.

12. A wireless communication device, comprising:
a transmitter configured to communicate according to a first communication protocol;
a receiver configured to communicate according to a second communication protocol that is different from the first communication protocol;
a first antenna coupled to the transmitter;
a second antenna coupled to the receiver and physically separated from the first antenna by a variable distance;
a memory; and
a processor coupled to the memory, the transmitter, the receiver, the first antenna, and the second antenna, wherein the processor is configured to:
transmit, via the first antenna, a first transmission within a first frequency range; and
receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission, wherein to perform the radio frequency coexistence mitigation procedure based on the variable distance between the first antenna and the second antenna the processor is configured to:
blank the transmitter in response to a first duty cycle of the transmitter exceeding a first threshold, or
blank the receiver in response to a second duty cycle of the receiver exceeding a second threshold.

13. The wireless communication device of claim 12, wherein to perform the radio frequency coexistence mitigation procedure based on the variable distance between the first antenna and the second antenna the processor is configured to:
blank the transmitter in response to the first duty cycle of the transmitter exceeding the first threshold.

14. The wireless communication device of claim 13, wherein to perform the radio frequency coexistence mitigation procedure based on the variable distance between the first antenna and the second antenna the processor is configured to:
blank the receiver in response to the second duty cycle of the receiver exceeding the second threshold.

15. The wireless communication device of claim 12, wherein to perform the radio frequency coexistence mitigation procedure based on the variable distance between the first antenna and the second antenna the processor is configured to:
blank the receiver in response to the second duty cycle of the receiver exceeding the second threshold.

16. A wireless communication device, comprising:
a transmitter configured to communicate according to a first communication protocol;
a receiver configured to communicate according to a second communication protocol that is different from the first communication protocol;
a first antenna coupled to the transmitter;
a second antenna coupled to the receiver and physically separated from the first antenna by a variable distance;
a first housing comprising the first antenna:
a second housing comprising the second antenna;
a hinge rotatably coupling the first housing and the second housing;
a sensor configured to generate measurement information indicative of an angle between the first housing and the second housing relative to the hinge;
a memory; and
a processor coupled to the memory, the transmitter, the receiver, the sensor, the first antenna, and the second antenna, wherein the processor is configured to:
obtain the variable distance between the first antenna and the second antenna based on the measurement information;
transmit, via the first antenna, a first transmission within a first frequency range; and
receive, via the second antenna, a second transmission within a second frequency range that overlaps the first frequency range, wherein, to receive the second transmission, the processor is configured to perform a radio frequency coexistence mitigation procedure based on the variable distance between the first antenna and the second antenna in response to detection of a concurrency in time between the first transmission and the second transmission.

17. The wireless communication device of claim 16, wherein the first housing is releasably coupled to the second housing.

18. A wireless communication device, comprising:
means for transmitting, via a first antenna, a first transmission within a first frequency range; and
means for receiving, via a second antenna, a second transmission within a second frequency range that overlaps the first frequency range, wherein, to receive the second transmission, the wireless communication device further includes:
means for performing a radio frequency coexistence mitigation procedure based on a variable distance between the first antenna and the second antenna in response to detection of a concurrency in time between the first transmission and the second transmission, wherein to perform the radio frequency coexistence mitigation procedure based on the variable distance between the first antenna and the second antenna the wireless communication device further comprises:
means for blanking the means for transmitting in response to a power of the means for transmitting exceeding a threshold that is based on the variable distance between the first antenna and the second antenna, or
means for blanking the means for receiving in response to the power of the means for transmitting exceeding the threshold that is based on the variable distance between the first antenna and the second antenna.

19. The wireless communication device of claim 18, further comprising:
means for obtaining a value corresponding to the variable distance between the first antenna and the second antenna based on at least one of: an indication of a shape of the wireless communication device, the variable distance between the first antenna and the second antenna, or an angle between first and second segments of the wireless communication device that respectively house the first antenna and the second antenna, and the means for performing the radio frequency coexistence mitigation procedure performs the radio frequency coexistence mitigation procedure based on the obtained value.

20. The wireless communication device of claim 18, wherein to perform the radio frequency coexistence mitigation procedure based on the variable distance between the first antenna and the second antenna the wireless communication device further comprises:
means for reducing a power of the means for transmitting to prevent the means for transmitting from exceeding a maximum transmitted power that is based on the variable distance between the first antenna and the second antenna.

21. The wireless communication device of claim 18, wherein to perform the radio frequency coexistence mitigation procedure based on the variable distance between the first antenna and the second antenna the wireless communication device further comprises:
means for time division multiplexing periods of transmission in the first frequency range by the means for transmitting with periods of reception in the second frequency range by the means for receiving.

22. The wireless communication device of claim 18, wherein to perform the radio frequency coexistence mitigation procedure based on the variable distance between the first antenna and the second antenna the wireless communication device further comprises:
means for preventing concurrent operation of the means for transmitting in the first frequency range and the means for receiving in the second frequency range.

23. The wireless communication device of claim 18, wherein to perform the radio frequency coexistence mitigation procedure based on the variable distance between the first antenna and the second antenna the wireless communication device further comprises:
means for activating or deactivating the radio frequency coexistence mitigation procedure based on a shape of the wireless communication device, wherein the shape of the wireless communication device is determinative of the variable distance between the first antenna and the second antenna.

24. The wireless communication device of claim 18, A wireless communication device, comprising:
- means for transmitting, via a first antenna, a first transmission within a first frequency range; and
- means for receiving, via a second antenna, a second transmission within a second frequency range that overlaps the first frequency range, wherein, to receive the second transmission, the wireless communication device further includes:
- means for performing a radio frequency coexistence mitigation procedure based on a variable distance between the first antenna and the second antenna in response to detection of a concurrency in time between the first transmission and the second transmission, wherein to perform the radio frequency coexistence mitigation procedure based on the variable distance between the first antenna and the second antenna the wireless communication device further comprises:
  - means for blanking the means for transmitting in response to a first duty cycle of the means for transmitting exceeding a first threshold, or
  - means for blanking the means for receiving in response to a second duty cycle of the means for receiving exceeding a second threshold.

\* \* \* \* \*

UNITED STATES PATENT AND TRADEMARK OFFICE
CERTIFICATE OF CORRECTION

Page 1 of 1

PATENT NO. : 12,267,827 B2
APPLICATION NO. : 17/729204
DATED : April 1, 2025
INVENTOR(S) : Francis Ming-Meng Ngai et al.

It is certified that error appears in the above-identified patent and that said Letters Patent is hereby corrected as shown below:

In the Claims

Column 49 Line 4: the phrase "The wireless communication device of claim 18," is removed.

Signed and Sealed this
Twenty-ninth Day of April, 2025

Coke Morgan Stewart
*Acting Director of the United States Patent and Trademark Office*